United States Patent
Sezan et al.

(10) Patent No.: US 10,146,981 B2
(45) Date of Patent: Dec. 4, 2018

(54) FINGERPRINT ENROLLMENT AND MATCHING WITH ORIENTATION SENSOR INPUT

(71) Applicant: QUALCOMM Incorporated, San Diego, CA (US)

(72) Inventors: Muhammed Ibrahim Sezan, Los Gatos, CA (US); Tao Sheng, Richmond Hill (CA); Alwyn Dos Remedios, Maple (CA); David William Burns, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/262,617

(22) Filed: Sep. 12, 2016

(65) Prior Publication Data
US 2017/0076132 A1 Mar. 16, 2017

Related U.S. Application Data

(60) Provisional application No. 62/216,904, filed on Sep. 10, 2015.

(51) Int. Cl.
*G06K 9/00* (2006.01)
*G06F 21/32* (2013.01)
(Continued)

(52) U.S. Cl.
CPC ......... *G06K 9/00013* (2013.01); *G06F 21/32* (2013.01); *G06F 21/6218* (2013.01);
(Continued)

(58) Field of Classification Search
CPC ...... G06F 21/32; G06F 3/017; G06F 21/6218; G06K 9/00013; G06K 9/00926
(Continued)

(56) References Cited

U.S. PATENT DOCUMENTS 6,876,757 B2 4/2005 Yau et al.
8,903,141 B2 * 12/2014 Heilpern ............ G06K 9/00013
382/115

(Continued)

*Primary Examiner* — Daniel G Mariam
(74) *Attorney, Agent, or Firm* — Kilpatrick Townsend & Stockton

(57) ABSTRACT

Techniques for associating environmental information with fingerprint images for fingerprint enrollment and matching are presented. The techniques may include capturing, using a fingerprint sensor of a mobile device, one or more images of a fingerprint. The techniques may include analyzing the one or more images to obtain fingerprint information associated with the fingerprint. The techniques may include obtaining, via an orientation sensor of the mobile device, environmental information indicating an orientation of the mobile device associated with the capturing of the one or more images. The techniques may additionally include generating, using the fingerprint information, an enrollment template for the fingerprint. The techniques may include associating the enrollment template with the environmental information. The techniques may include storing the enrollment template and the environmental information in a memory of the device, wherein the stored enrollment template is associated with the environmental information.

35 Claims, 15 Drawing Sheets

(51) Int. Cl.
*G06F 21/62* (2013.01)
*G06F 3/01* (2006.01)

(52) U.S. Cl.
CPC .......... *G06K 9/00926* (2013.01); *G06F 3/017* (2013.01); *G06K 2209/27* (2013.01)

(58) Field of Classification Search
USPC ............................... 382/115, 124, 209, 305
See application file for complete search history.

(56) References Cited

U.S. PATENT DOCUMENTS

| | | |
|---|---|---|
| 9,152,842 B2 | 10/2015 | Vieta et al. |
| 9,211,811 B2 * | 12/2015 | Breed ..................... B60C 11/24 |
| 2002/0071677 A1 * | 6/2002 | Sumanaweera ... G06F 17/30265 396/429 |
| 2004/0125993 A1 | 7/2004 | Zhao et al. |
| 2008/0273770 A1 | 11/2008 | Kohout |
| 2013/0223696 A1 * | 8/2013 | Azar ................. G06K 9/00892 382/118 |
| 2014/0003683 A1 | 1/2014 | Vieta et al. |
| 2016/0063235 A1 * | 3/2016 | Tussy ...................... G06F 21/32 726/6 |
| 2016/0217310 A1 * | 7/2016 | Shah ...................... G06K 9/001 |
| 2016/0234430 A1 * | 8/2016 | Setterberg .......... G06K 9/00013 |

\* cited by examiner

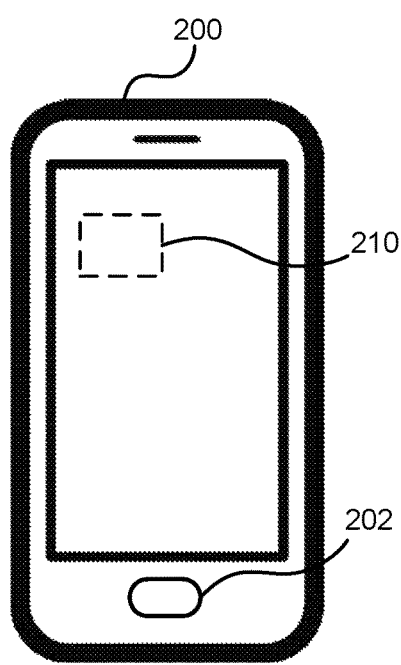
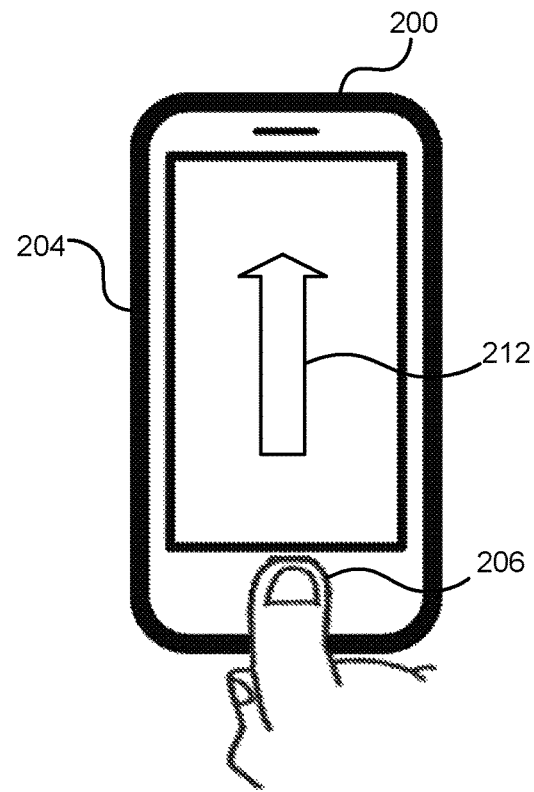
FIGURE 3
FIGURE 4
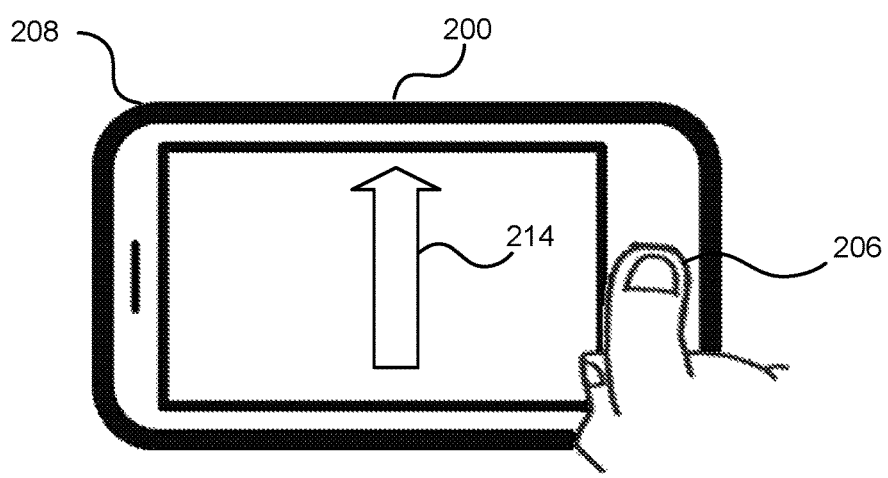
FIGURE 5

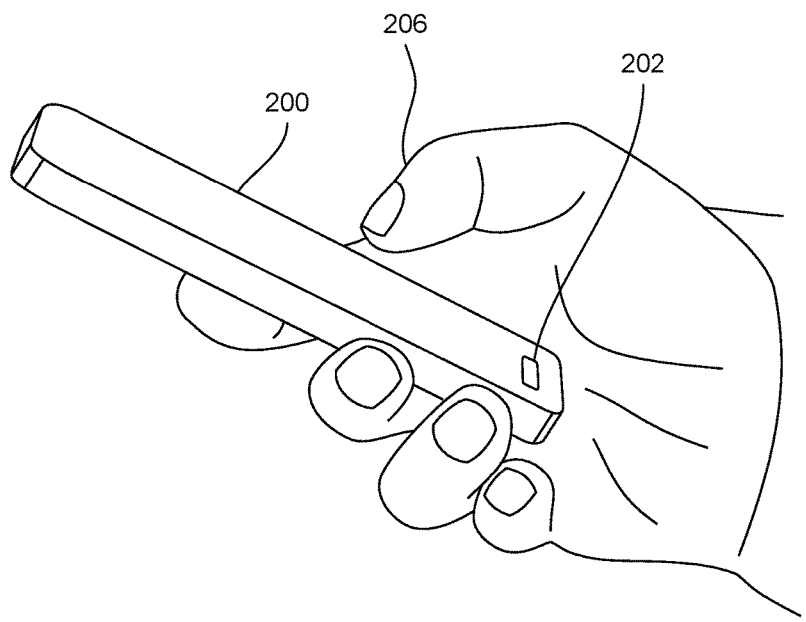
FIGURE 9
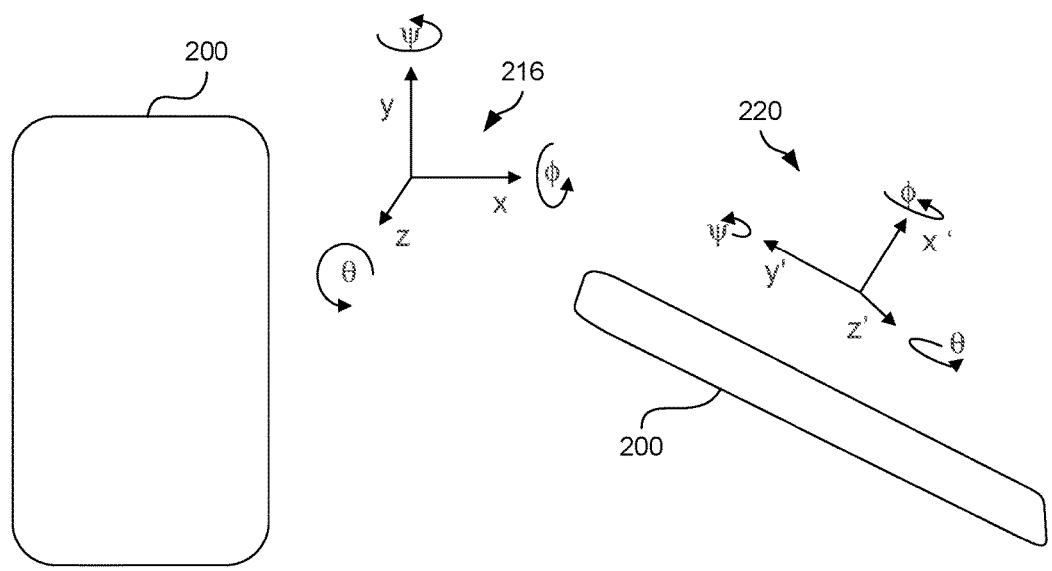
FIGURE 10
FIGURE 11

FINGERPRINT ENROLLMENT AND MATCHING WITH ORIENTATION SENSOR INPUT

CROSS-REFERENCE TO RELATED APPLICATIONS

This application claims priority to U.S. Provisional Application No. 62/216,904, filed Sep. 10, 2015, the disclosure of which is incorporated by reference herein in its entirety.

BACKGROUND

Aspects of the disclosure relate to fingerprint enrollment and matching for mobile electronic devices.

Today, mobile devices may be multi-functional devices (e.g., smartphones) that can be used for a wide variety of purposes including social interaction, financial transactions, personal healthcare management, work related communications, business dealings, etc. As such, these devices can store and/or display confidential and/or sensitive data. Fingerprint recognition on mobile devices using biometric sensors can provide an enhanced level of security for a user (e.g., owner) of the mobile device, as it is difficult to duplicate or imitate the user's unique fingerprint data. Additionally, fingerprint sensors can offer a level of convenience by enabling quick, secure access to the mobile device using inherent biometric features of the user.

Various techniques can be used to enroll a user to access a mobile device through use of a biometric sensor. Enrollment can include generation of a fingerprint template, for example. At a later time, for a user to access the device, the user can present a fingerprint for imaging. The image can be compared to stored fingerprint template(s). If a match is successful, the user may be validated and/or verified for access to the device or features of the device. If the match is unsuccessful, the user may be denied access to the device or features of the device.

Accordingly, a need exists for increased speed and accuracy for biometric authentication of a user.

BRIEF SUMMARY

Some example techniques are presented herein that may be implemented according to certain embodiments with a mobile device to provide increased speed and accuracy for biometric authentication of a user.

In accordance with some implementations, a method may include capturing, using a fingerprint sensor of a mobile device, one or more images of a fingerprint. The method may also include analyzing the one or more images to obtain fingerprint information associated with the fingerprint. The method may further include obtaining, via an orientation sensor of the mobile device, environmental information indicating an orientation of the mobile device associated with the capturing of the one or more images. The method may additionally include generating, using the fingerprint information and the environmental information, an enrollment template for the fingerprint. The method may also include storing the enrollment template in a memory of the mobile device, wherein the fingerprint information of the stored enrollment template is associated with the environmental information.

The environmental information may include orientation information that indicates an orientation of the mobile device when the one or more images are captured. The enrollment template may be stored in a database. Enrollment templates stored in the database may be indexed by the environmental information. The method may further include capturing, using the fingerprint sensor of the mobile device, one or more images of a second fingerprint. The method may also include obtaining, via the orientation sensor of the mobile device, environmental information indicating an orientation of the mobile device associated with the capturing of the one or more images of the second fingerprint. The method may additionally include searching, using the environmental information indicating the orientation of the mobile device associated with the capturing of the one or more images of the second fingerprint, for a stored enrollment template corresponding to the one or more images of the second fingerprint.

The environmental information may additionally indicate at least one of a temperature, a location, a humidity level, an ambient light level, or a time. The mobile device may include, for obtaining the environmental information, at least one of an accelerometer, orientation sensor, angular rate sensor, gyroscope, magnetometer, location sensor, temperature sensor, pressure sensor, ambient light sensor, camera, microphone, or humidity sensor. The method may include prompting, by the mobile device, a user to present a finger at an indicated orientation in relation to the mobile device for capturing the one or more images and the environmental information. The fingerprint information may be associated with orientation information based on the orientation of the device and the indicated orientation prompted to the user. The method may include prompting, by the mobile device, a user to orient the mobile device at a preferred orientation for capturing the one or more images and the environmental information.

In accordance with some implementations, a mobile device may be provided that includes a fingerprint sensor, an orientation sensor, a memory, and processing logic. The processing logic may be configured to capture, using the fingerprint sensor, one or more images of a fingerprint. The processing logic may be further configured to analyze the one or more images to obtain fingerprint information associated with the fingerprint. The processing logic may be also configured to obtain, via the orientation sensor, environmental information indicating an orientation of the mobile device associated with the capturing of the one or more images. The processing logic may be also configured to generate, using the fingerprint information and the environmental information, an enrollment template for the fingerprint. The processing logic may be additionally configured to store, in the memory, the enrollment template, wherein the fingerprint information of the stored enrollment template is associated with the environmental information.

The environmental information may include orientation information that indicates an orientation of the mobile device when the one or more images are captured. The processing logic may be further configured to store the enrollment template in a database, wherein enrollment templates stored in the database are indexed by the environmental information. The mobile device may further include, for obtaining the environmental information, at least one of an accelerometer, orientation sensor, angular rate sensor, gyroscope, magnetometer, location sensor, temperature sensor, pressure sensor, ambient light sensor, camera, microphone, or humidity sensor. The processing logic may be configured to display, via a display of the mobile device, a prompt for a user to present a finger at an indicated orientation in relation to the mobile device for capturing the one or more images and the environmental information. The processing logic may be additionally configured to associate the fingerprint information with orientation information based on the orientation of the device and the indicated orientation prompted to the user. The processing logic may be additionally configured to display, via a display of the mobile device, a prompt for a user to orient the mobile device at a preferred orientation for capturing the one or more images and the environmental information.

In accordance with some implementations, one or more non-transitory computer-readable media storing computer-executable instructions executable by one or more processors may be provided that, when executed by the one or more processors, configures the one or more processors to capture, using a fingerprint sensor of a mobile device, one or more images of a fingerprint. The instructions may further configure the one or more processors to analyze the one or more images to obtain fingerprint information associated with the fingerprint. The instructions may also configure the one or more processors to obtain, via an orientation sensor of the mobile device, environmental information indicating an orientation of the mobile device associated with the capturing of the one or more images. The instructions may additionally configure the one or more processors to generate, using the fingerprint information and the environmental information, an enrollment template for the fingerprint. The instructions may additionally configure the one or more processors to store the enrollment template in a memory of the mobile device, wherein the fingerprint information of the stored enrollment template is associated with the environmental information.

The environmental information may include orientation information that indicates an orientation of the mobile device when the one or more images are captured. The instructions may further configure the one or more processors to store the enrollment template in a database, wherein enrollment templates stored in the database are indexed by the environmental information.

In accordance with some implementations, a method may include capturing, using a fingerprint sensor of a mobile device, one or more images of a fingerprint. The method may also include obtaining, via an orientation sensor of the mobile device, environmental information indicating an orientation of the mobile device associated with the capturing of the one or more images. The method may further include authenticating a user of the mobile device based on the one or more images and the environmental information.

The environmental information may include orientation information that indicates an orientation of the mobile device when the one or more images are captured. The authenticating the user of the mobile devices may include determining whether the one or more images correspond to an enrollment template. The authenticating the user of the mobile devices may also include, upon determining that the one or more images corresponds to the enrollment template, authenticating the user of the mobile device to access a function of the mobile device. The authenticating the user of the mobile devices may further include, upon determining that the one or more images does not correspond to an enrollment template of the plurality of templates, denying the user access to the function of the mobile device. The authenticating the user of the mobile devices may additionally include selecting the enrollment template from a plurality of enrollment templates each corresponding to different reference environmental information, the selecting based on determining a similarity between the environmental information and the reference environmental information. The selecting may include determining that reference environmental information corresponding to the enrollment template has a higher degree of similarity to the environmental information than the reference environmental information corresponding to the other enrollment templates of the plurality of enrollment templates.

The environmental information and the reference environmental information additionally may contain information indicative of at least one of a temperature, a location, a humidity level, an ambient light level, or a time. The information indicative of at least one of a temperature, a location, a humidity level, an ambient light level, or a time may be captured when the one or more images are captured. The determining the similarity may be based on a tolerance based upon the environmental information.

The method may also include characterizing an environment of the mobile device when the one or more images are captured. The method may additionally include determining whether the characterized environment indicates that the mobile device is located in an environment hostile to accurate fingerprint imaging. The method may also include, upon determining that the characterized environment indicates that the mobile device is located in an environment hostile to accurate fingerprint imaging, relaxing the tolerance. The characterized environment indicating that the mobile device is located in an environment hostile to accurate fingerprint imaging may indicate that the mobile device is located with an automobile.

BRIEF DESCRIPTION OF THE DRAWINGS

Aspects of the disclosure are illustrated by way of example. In the accompanying figures, like reference numbers indicate similar elements.

FIGS. 3-5 illustrate various configurations of a mobile device that may implement the flowcharts of FIG. 1 and FIG. 2.

FIGS. 9-11 illustrate an example of a mobile device in a user's hand that is oriented in a particular manner when the user desires to be authenticated.

DETAILED DESCRIPTION

Figure 1:
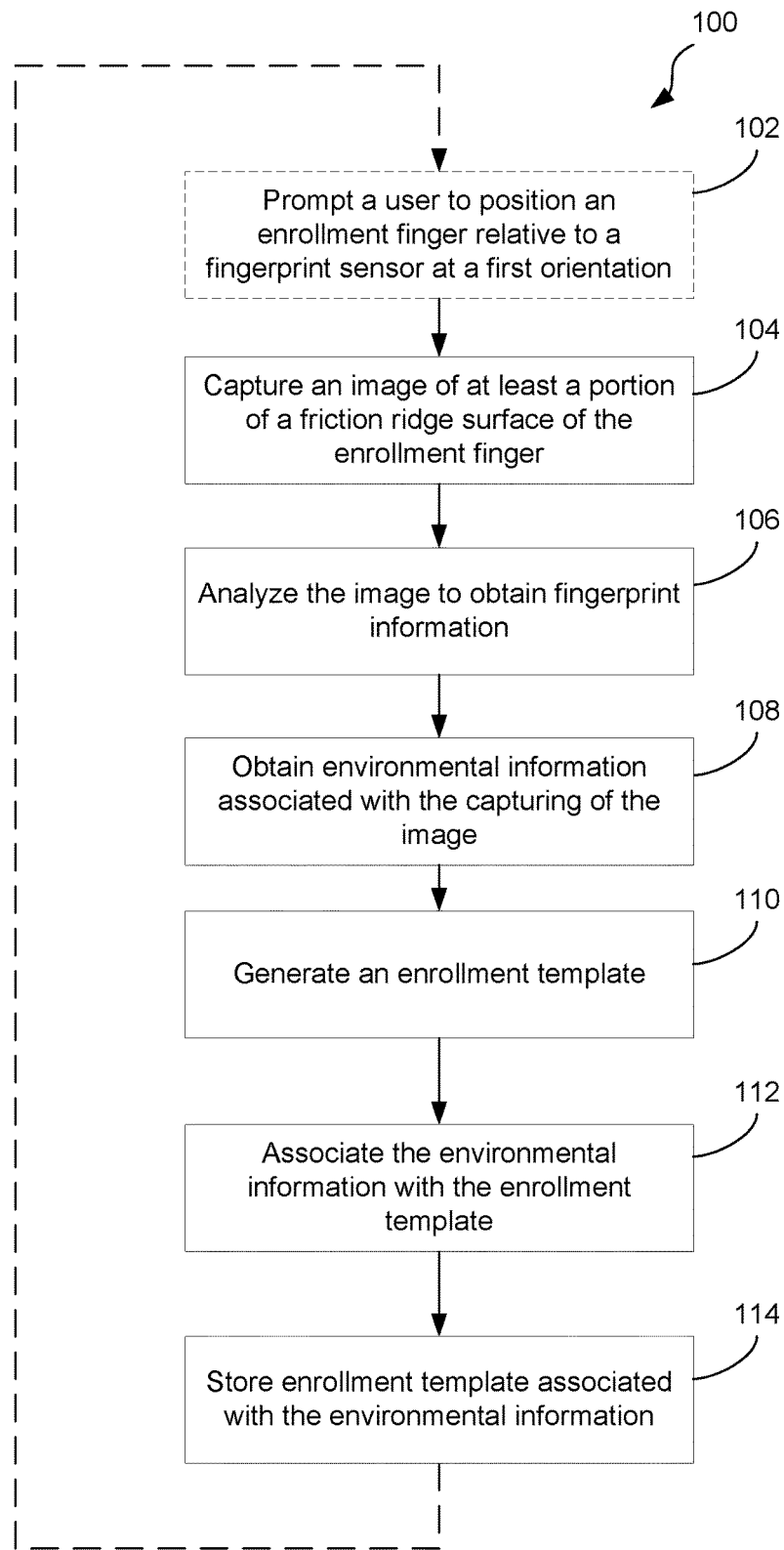
FIG. 1 illustrates a flowchart for generating an enrollment template with associated environmental information.

Several illustrative embodiments will now be described with respect to the accompanying drawings, which form a part hereof. While particular embodiments in which one or more aspects of the disclosure may be implemented are described below, other embodiments may be used and various modifications may be made without departing from the scope of the disclosure or the spirit of the appended claims.

Biometric sensors for mobile devices, including fingerprint sensors, are becoming increasingly prevalent due to, for example, increasing popularity of mobile electronic devices such as smartphones and tablet computers. A fingerprint, as used herein, means a friction-ridge surface of a finger. Due to size limitations and increasing complexities of mobile electronic devices, available space for each electronic component (such as for a biometric sensor) of a mobile device is generally becoming more limited. Additionally, many mobile electronic devices attempt to combine the functionality of components (such as a button with an integrated biometric sensor) to further improve space utilization of a mobile device and/or functionality. The limited space to implement biometric authentication systems may result in systems that are relatively slow and/or less accurate when attempting to biometrically authorize a user. However, users of mobile devices may desire positive user experiences that include fast, convenient and accurate biometric authentication.

The present disclosure focuses on techniques for improving speed and accuracy using fingerprint sensors (such as ultrasonic imaging arrays, capacitive sensors, optical sensors, infrared sensors, RF sensors, thermal sensors and the like), but the techniques are not limited to this subset of biometric sensors and may be used with various biometric or other sensors for user authentication. Some fingerprint sensors may capture an image of an entire fingerprint and may have an active imaging area of about 25 mm×25 mm. However, the size of images captured by miniaturized fingerprint sensors for smartphones may be much smaller, with active image areas on the order of about 15 mm×6 mm, 8 mm×8 mm, 9 mm×4 mm, 8 mm×3 mm, 5 mm×5 mm, and smaller. The size of images of a sensor may be directly related to a size of the fingerprint sensor. As such, a fingerprint sensor of a smartphone or other mobile device may capture an image of only a small portion of a fingerprint at a time.

During enrollment (e.g., generation of a reference fingerprint template for later matching purposes), a finger may be positioned over a fingerprint sensor in a variety of positions and/or orientations. One or more images may be captured at each position and/or orientation. The resulting images may be stitched together to form a more complete (e.g., full) image of a fingerprint. Stitching techniques may be used during enrollment for creation of a fingerprint template and/or for later matching purposes when a user is attempted to be authorized by matching an acquired fingerprint image (s) to an enrolled fingerprint template. Stitching may include matching some features of a first image with features of a second image to reorient, change the size of, overlap, and/or otherwise combine two images together to form a larger image.

It should be noted that fingerprint templates may not necessarily include an image of a fingerprint, but may instead contain information used to uniquely identify a fingerprint. Given privacy concerns for biometric data, it may be desirable not to store information on an electronic device that may be used to recreate a user's biometric signature (e.g., a fingerprint). Instead, fingerprint identification information may be stored in a template to uniquely identify a fingerprint. The fingerprint identification information may not be complete, in order to preclude recreation of a fingerprint image from the information. For example, a fingerprint template may store feature information for a fingerprint. The template may store information for performing minutiae-matching or pattern-matching (a.k.a. keypoint-matching) techniques. Thus, fingerprint templates may contain information about minutiae points or keypoints within a fingerprint image, for example.

During matching, if captured image(s) of a user's fingerprint cannot be matched with an enrolled template, a fingerprint matching component of a mobile electronic device may deny the user access to the device. If the fingerprint matching component fails to correctly verify the user, the mobile device may falsely reject the user as being unauthorized to access a device or a function of a device (e.g., authorizing a money transfer, accessing email, etc.). For example, a mobile device may capture an image of a fingerprint of a user and fail to properly match the image of the fingerprint to a valid template for that user. False rejections may occur for various reasons. For example, an image may be noisy due to environmental factors (a dirty sensor/finger, a frosty platen surface, etc.), a matching technique may be insufficiently accurate, or an amount of time for performing the matching may have expired (i.e., timed out). The fingerprint matching component may falsely accept a user as being authorized for a desired task by incorrectly matching an acquired fingerprint image of a potential user to a template that does not belong to the user.

Image(s) of a fingerprint captured by an electronic device may vary due to factors such as finger orientation, the moisture content of the user's skin, an amount of force applied to the sensor by the user, the existence of foreign debris between the finger and the sensor, etc. As such, matching techniques may account for some variability when attempting to match templates captured during the enrollment process to the image(s) capturing during matching. Variability in the matching techniques may contribute to instances of false positive (incorrectly matching a fingerprint image with a template) and false negative (failing to match a fingerprint with a correct template) matches.

As described herein, enrollment techniques may generate one or more fingerprint templates for each of one or more users. The enrollment templates may be stored within a database. A fingerprint template that is stored as part of an enrollment process may be referred to herein as an enrollment template. The database may include templates stitched together from multiple fingerprint images. Furthermore, matching techniques may use stitching, or other techniques, which may be used in conjunction with the aforementioned variably tolerant techniques. Thus, matching techniques may be complex, requiring extensive processing and electrical power, and/or time consuming. If the matching process is performed by a mobile electronic device, increased processing requirements may lead to decreased battery life or excessively long verification times for users of the device.

In some implementations, techniques are disclosed for authenticating a user of a mobile device by generating and storing one or more enrollment templates and associating orientation or other environmental information of the mobile device with the enrollment template(s). During matching, the stored enrollment template(s) with associated environmental information may be compared with one or more inquiry templates and environmental information captured with the one or more inquiry templates. In some implementations, inquiry templates may be used for matching, as disclosed herein. In some implementations, each enrollment template may describe a biometric object (e.g., a friction-ridge surface of a finger) of a user. The enrollment template may be used to authenticate the user at a later time. In contrast to the enrollment template, an inquiry template may describe a biometric object (e.g., a friction-ridge surface of a finger) of a user that desires to be authenticated to perform a task with the mobile device. This user may or may not be the same user that provided the biometric object for enrollment. The inquiry template may be compared to the enrollment template(s) to authenticate a rightful user for access to a device or a function of a device. Enrollment templates and inquiry templates may each be stored in a computer-readable format, such as within a database.

In some implementations, enrollment templates may be stored in a database wherein each enrollment template is associated with a user. Alternatively, each user may be associated with several enrollment templates. When a user is authenticated using matching techniques, a fingerprint image may be acquired from the individual, an inquiry template may be generated, and/or the inquiry template may be compared separately to one or more of the enrollment templates. For example, features (such as minutiae) identified in the inquiry template may be compared to features found in each stored enrollment template(s). A degree of similarity between these features may be determined in order to assess whether the inquiry template and the enrollment template may be declared to match one another. The degree of similarity may be quantified and represented as a match score. As such, the match score may indicate how similar the enrollment template is to the inquiry template. In some implementations, two or more images acquired during an enrollment process may be stitched together to form one enrollment template. In some implementations, each enrollment template may be a non-stitched image and compared to an inquiry template generated from a non-stitched image. In a hybrid approach, one or more enrollment templates based on stitched images and one or more templates based on un-stitched (e.g., single) images may be stored within a database for use in matching/verification techniques.

By comparing the inquiry template to one or more of the enrollment templates, a match score may be generated for each of the comparisons. Consequently, a match score may be generated for each of the compared enrollment templates to a certain inquiry template. The match scores may be mathematically fused to produce a composite match score. In some implementations, the inquiry template may be sequentially compared to different enrollment template(s) until an acceptable match score or composite match score is generated. In some implementations, an acceptable match score for several enrollment templates may be desired to identify a valid match. For example, a plurality of enrollment templates may be associated with a user. Each of the templates of the user may require a threshold match score for the inquiry template to be deemed a match with the user. Alternatively, composite scores may be used to determine if an inquiry template matches a set of enrollment templates.

In some implementations, an acceptance range may be identified and compared with a composite match score in order to assess whether an individual is authenticated. For example, the composite match score may be compared to the acceptance range, and if the composite match score is within the acceptance range, the individual may be authenticated. However, if the composite match score is not within the acceptance range, the individual may not be authenticated. A threshold value may be used instead of or in conjunction with the acceptance range.

The comparison of each inquiry template with each enrollment template may be relatively time consuming and/or require complex computations, especially as the number of enrollment templates to be compared increases. An enrollment template repository or database may include multiple templates for each user, for multiple users, and/or for different orientations of a user's fingerprints. In some implementations, an enrollment template database may be supplemented with environmental information associated with each enrollment template. The environmental information may be used to improve the speed and/or accuracy of matching techniques. In some implementations, an orientation of a mobile device used to generate an enrollment template may be stored within the database and associated with the enrollment template. For example, an orientation of the mobile device determined for generation of an inquiry template may be used to improve the speed of the matching process by prioritizing comparisons with stored enrollment templates having similar orientations.

Once authenticated, a user may be permitted to engage in an activity using the device that is permitted for the user. For example, an authenticated user may be permitted to access a computer database, use a computer, use a mobile electronic device, access or otherwise use a software application running on a mobile device, access certain functionality of a device, or initiate a function. Certain functionalities of a device may be organized by groups into certain levels of authentication. When a user is authenticated to a certain level, they may have access to these groups of features. Furthermore, authentication may be required for certain "high risk" functions such as accessing bank accounts or other.

Although many types of biometric identification techniques may be used in accordance with this disclosure, certain embodiments are disclosed that pertain to friction-ridge surfaces of a finger. Each of enrollment templates and/or inquiry template may be generated by scanning a portion of a friction-ridge surface of a finger. One or more ultrasonic fingerprint sensors, which may be area-array sensors, may be used for this purpose. Capacitive fingerprint sensors (active or passive), radio-frequency (RF) fingerprint sensors, optical fingerprint sensors, thermal sensors, area or swipe sensors, or other types of fingerprint sensors may be used. An example of an ultrasonic area-array sensor that is suitable for this purpose is described in U.S. Pat. No. 7,739,912 entitled "Ultrasonic Fingerprint Scanning Utilizing a Plane Wave" which is hereby incorporated for all purposes.

Having provided a general overview of techniques for biometrically authenticating a user, additional details are now provided. As stated previously, environmental information pertaining to an environment in which biometric data that is captured may be associated with one or more enrollment templates. Examples of environmental information include an orientation of the capturing device, an ambient temperature, an atmospheric pressure, a moisture content of the user or the environment, a location of the capturing device, forces or vibrations incident upon the capturing device, ambient sounds, or other sensor information. The forces (and/or location information) may be used to detect if the device is being used in an automobile, for example, by sensing if detected changes in forces over time correspond to forces generated by a car engine or via contact with an automobile travelling over road surface. Furthermore, location information may be used to determine if a mobile device is traveling along a route known to frequently be associated with automobile travel with the device. A speed of the device may be determined which, if within a range of values, may be used to indicate that the mobile device is traveling with a vehicle. Ambient sounds may provide general or specific environmental information, such as road noise or the quiet of an overnight stay.

The orientation information of the capturing device may be used to detect if the capturing device is being held upright. For example, if the capturing device is a smartphone, the device may be orientated in a portrait, landscape, or other profile. The orientation for each of multiple axes of the device may be obtained to detect, for example, if the device were placed within an automobile, held by a user, placed upon a table or nightstand, or other position. For example, orientation sensors of a mobile device may be used to detect if the mobile device is predominantly oriented in a landscape or portrait profile with relatively steady amounts of modest background vibration. If so, this may indicate that the device may be being used within an automobile. This information may be used in conjunction with additional environmental information (such as the aforementioned location information, vibration information or ambient noise) to aid in determination of environment of the mobile device. The environmental information may be obtained using sensors integrated within the capturing device or remotely from external sensors, retrieved from local or remote databases, or crowdsourced.

As disclosed herein, enrollment templates and associated environmental information may be stored in a database for later retrieval, such as during a matching technique in which an inquiry template is attempted to be matched to an enrollment template. By obtaining environmental information during an inquiry process, the matching process may be enhanced and/or accelerated by prioritizing certain enrollment templates within the database for use during the matching techniques. For example, the environmental information may be used to detect if the capturing device is oriented at, or close to, an orientation associated with certain enrollment templates. Alternative environmental information may be used to improve upon the matching process used in conjunction with, or separate from, the orientation information. A temperature of the environment, for example, may be used to down select between stored enrollment templates. Temperature information may affect characteristics of the biometric capturing sensor and/or the user's biological signature. In some implementations, one or more transforms may be performed on an inquiry or an enrollment template. For example, an inquiry template may be modified based on a difference between a temperature detected at time of inquiry (matching) and a temperature associated with an enrollment template. Transformations may include softening certain minutiae, altering a contrast of an image, etc.

Additional or alternative environmental information may be obtained or retrieved by a device including a humidity level, a location of the device, an elevation of the device, etc. Using this information, the enrollment templates may be prioritized and/or subdivided during matching such that matching may be performed on templates more likely to result in a positive match. This additional or alternative environmental information may be used for transformation of an inquiry or enrollment template. In some implementations, an orientation of a device may be used to transform an orientation of a template. For example, as disclosed herein, an enrollment template may be known to be associated with a certain orientation of the mobile device. An orientation of the mobile device during inquiry may be used to transform orientation(s) associated with each of multiple enrollment templates to expedite or otherwise improve matching techniques by orienting the templates to a similar orientation of the inquiry template.

Additionally, the environmental information may be used to alter other variables used during matching or enrollment techniques. For example, the environmental information may be used to detect if the capturing device is being subjected to vibration forces, such as if the device is located within a moving automobile. In such an environment, the threshold for obtaining a positive biometric match may be relaxed to improve the likelihood that a positive match is located. Similarly, tolerances may be relaxed if the user is walking or running. In these instances it may be desirable to accept higher false acceptance rates in order to improve the speed of matching techniques. In some implementations, a match threshold for a particular user may be adjusted based on environmental information obtained during enrollment or matching. For example, an acceptance range or a match score threshold value may be adjusted based on local environmental information such as the orientation and/or vibration level of the mobile device during acquisition of an inquiry fingerprint image. In some implementations, a humidity sensor may be used to adjust variables for fingerprint matching techniques. For example, if it is determined that an environment is relatively humid (such as when a user exits a shower), tolerances may be relaxed to enable a higher probability of the user being authenticated.

In some implementations, tolerances may be made more stringent depending on environmental conditions. For example, it may be determined that a mobile device is located within a substantially ideal location for capturing an inquiry template (e.g., the mobile device may be stationary inside a controlled environment, such as a home of a user). If such a determination is made, tolerances may be decreased or tightened to make it more difficult to falsely match an inquiry template to an enrollment template.

Enrollment Template Generation

FIG. 1 illustrates a flowchart 100 embodying techniques for generating one or more enrollment templates associated with corresponding environmental information. At step 102, a user may optionally be prompted to position a finger relative to a fingerprint sensor at a first orientation for enrollment. For example, if the user were using a smartphone device, the smartphone may display a cued orientation arrow for the device and/or user finger, as will be described in greater detail herein. The cued orientation may indicate to a user how the device should be orientated and/or how the user's finger should be oriented in relation to the device. Using this information, the device may infer the orientation of the user's finger in relation to the device (assuming that the user followed the cues). In some implementations, a user may be prompted to position the mobile device in one or more orientations during enrollment of a finger, such as on a desktop, in a preferred pocket or purse, while on the dash or console of an automobile, or while walking.

At step 104, a fingerprint image may be acquired in order to capture at least a portion of a friction ridge surface of the finger used for enrollment. Several different sensor technologies may be used to capture an image of a friction ridge surface of an enrollment finger. For example, an ultrasonic, optical, infrared, RF, capacitive, thermal or other sensor type may be used. As disclosed herein, the image may be only of a portion of a friction ridge surface of the finger. At step 106, the image may be analyzed to obtain fingerprint information. For example, minutiae, keypoints or other features of the image may be obtained that may be used to characterize a fingerprint. At step 108, environmental information may be obtained associated with the capturing of the image. The environmental information may include information concerning an orientation of the fingerprint sensor device, a temperature, a humidity level, a location, one or more forces acting upon the fingerprint sensor device, a linear acceleration, an angular acceleration, a rotation rate, a pressure, a magnetic field vector, ambient light, ambient sounds, an optical image, a time of day, etc. At step 110, an enrollment template may be generated using the fingerprint information. At step 112, the enrollment template may be associated with the environmental information. In some implementations, the environmental information may be included with the enrollment template. In some implementations, a link or other reference to the environmental information may be included with the enrollment template.

At step 114, the enrollment template with associated environmental information may be stored. In some implementations, the enrollment template may be indexed in a database to aid in future retrieval during matching attempts. In some implementations, a plurality of enrollment templates may be associated with environmental information. Each template need not be associated with a singular environmental information dataset. Multiple templates may be associated with similar or identical corresponding environmental information for instances, for example, when several templates are generated without significant changes in the environment. Alternatively, each template may have several sets and/or types of environmental information associated therewith. For example, if the environmental information contains pressure and orientation information, each enrollment template may separately be associated with a pressure and one or more orientations. In some implementations, the cued angle may be associated and stored with one or more enrollment templates. The techniques of flowchart 100 may be implemented sequentially for multiple fingers of a user, for the same finger of a user, and/or for fingers of different users.

Additional steps may be performed to verify if the enrollment template and/or an image is sufficient for biometric authorization purposes. For example, a signal-to-noise ratio, an image quality value or other attribute of an image or template may be analyzed. If the attributes indicate that an image or template may not be sufficient for matching techniques, the image or template may be discarded and/or the user may be prompted for capture of additional image(s).

Figure 2:
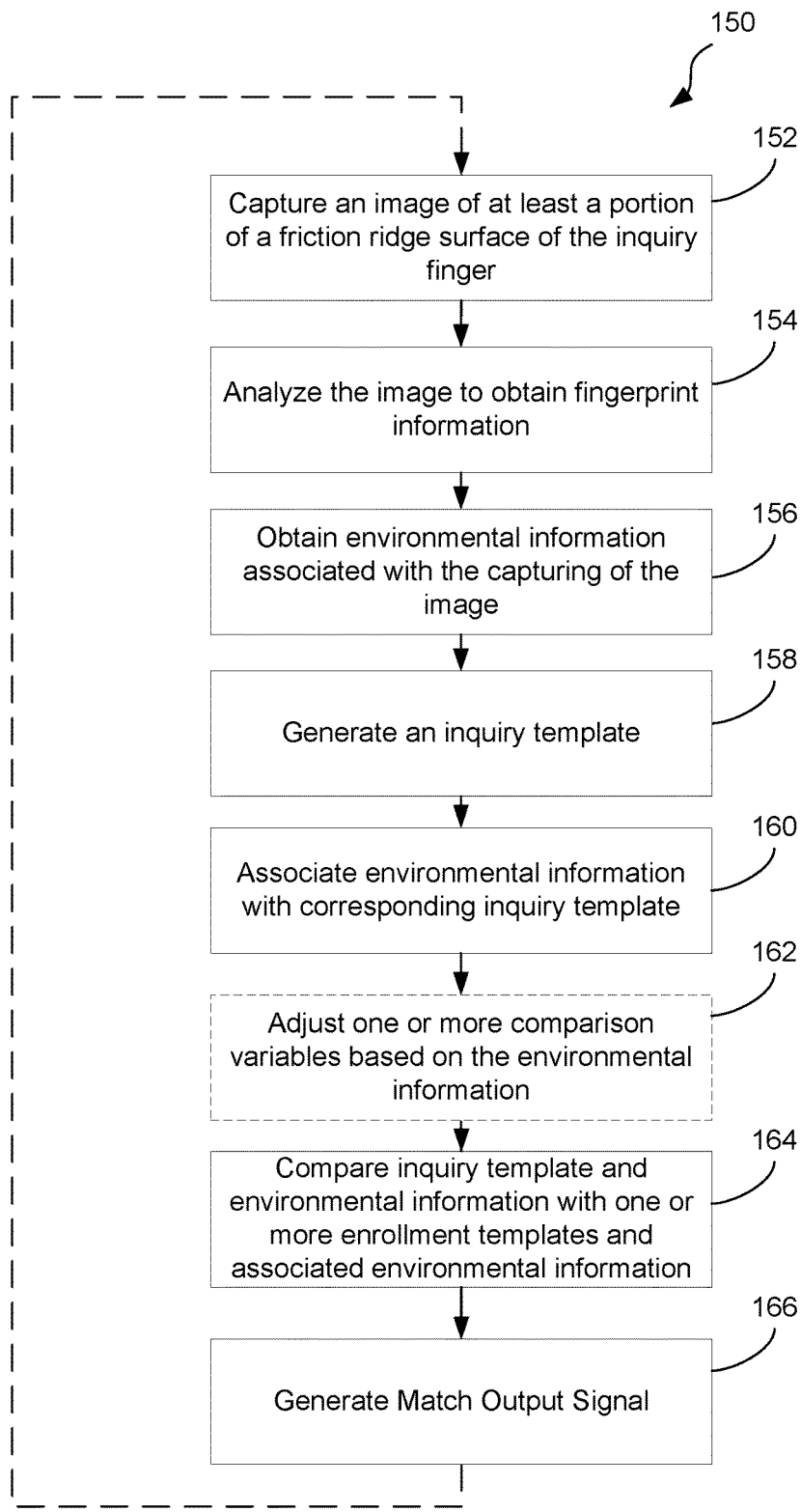
FIG. 2 illustrates a flowchart for matching an inquiry template with associated environmental information.

FIG. 2 illustrates a flowchart 150 embodying techniques for generating one or more inquiry templates associated with corresponding environmental information and matching the inquiry template with an enrollment template. At step 152, an image of a fingerprint may be acquired in order to capture at least a portion of a friction ridge surface of the finger used for inquiry. Several different sensor technologies may be used to capture an image of a friction ridge surface of an enrollment finger. For example, an ultrasonic, optical, infrared, RF, capacitive, thermal or other sensor type may be used. As disclosed herein, the image may be only of a portion of a friction ridge surface of the finger. At step 154, the image may be analyzed to obtain fingerprint information. For example, minutiae, keypoints or other features of the image may be obtained that may be used to characterize a fingerprint. At step 156, environmental information may be obtained associated with the capturing of the image. The environmental information may include information concerning an orientation of the fingerprint sensor device, a temperature, a humidity level, a location, one or more forces acting upon the fingerprint sensor device, a linear acceleration, an angular acceleration, a rotation rate, a pressure, a magnetic field vector, ambient light, ambient sounds, an optical image, a time of day, etc. At step 158, an inquiry template may be generated using the fingerprint information. At step 160, the inquiry template may be associated with the environmental information.

At step 162, one or more variables may optionally be adjusted for comparison of the inquiry template to the enrollment template(s) based on the environmental information. For example, a tolerance for determining an acceptable match between an inquiry template and an enrollment template may be adjusted. This tolerance may be relaxed if, for example, the mobile device is determined to be in an inclement environment (such as a high vibration environment).

At step 164, the inquiry template and the environmental information associated with the inquiry template may be compared with one or more enrollment templates and associated environmental information. For example, the environmental information obtained during capture of the inquiry finger image may be used to down select, re-order and/or otherwise expedite searching of a database storing enrollment templates. For example, fingerprint templates associated with dissimilar environmental information may be excluded from being compared with the inquiry template. In some implementations, enrollment templates may be prioritized based on, for example, rank of similarity of environmental information to the inquiry template. Additional information may be used to aid in expediting and improving searching of the enrollment template database. For example, historical information regarding a location and/or time of a device may be used. In some implementations, it may be known that a user successively places a mobile device in a similar position at a certain time of day (on a nightstand in the evening, for example). This information may be used to aid in selection of enrollment template(s) for comparison to an inquiry template. In some implementations, one or more transformations may be applied, as described herein, on inquiry and/or enrollment templates for comparison purposes. In some implementations, a history of successful matches to a certain enrollment template based on environmental information may be used as a factor to select enrollment template(s) for comparison. For example, a specific enrollment template may have been found to successfully be matched when a mobile device is in a certain orientation, at a certain location, and/or at or near a certain time of day. This information may be used to enhance a ranking or a selection of enrollment templates for comparison techniques.

At step 166, a match output signal may be generated. The match output signal may indicate if a match has been successfully determined between an inquiry template and an enrollment template, a level of confidence of a match, or other information.

FIGS. 3-5 illustrate a mobile device 200 that may be used to implement the techniques of flowcharts 100, 150 and/or other features of embodiments. FIG. 3 includes a mobile device 200 and a biometric sensor 202 (which may include a fingerprint sensor) that may take the form of an ultrasonic, capacitive, radio frequency (RF), thermal, infrared or optical fingerprint imaging sensor, for example. The mobile device 200 may include an environmental sensor suite 210 that may include sensors such as accelerometers, gyroscopes, location sensors, magnetometers, barometers, temperature sensors, humidity sensors, position sensors, orientation sensors, cameras, microphones, etc. The term environmental sensor suite indicates that some or all of the sensors in the sensor suite may be used to detect characteristics of the mobile device's 200 environment and/or the mobile device's 200 interaction with the environment (such as its orientation or location within the environment). As such, the environmental sensor suite 210 is meant to be non-limiting and may include data links to external servers or other devices to obtain environmental information. FIG. 4 and FIG. 5 show an optional cued orientation indicator 212, 214 on the display of the mobile device 200 for use during the enrollment procedure (i.e., during step 102 of FIG. 1). In FIG. 4, the mobile device 200 is depicted in a portrait orientation 204. The indicator 212 may be displayed to prompt the user to orient his/her finger 206 in the direction of the arrow. The environmental sensor suite 210 may be used to obtain environmental information pertaining to the orientation of the mobile device 200 when the biometric signature of the cued oriented finger is captured. The information regarding the cued orientation and the device's orientation and other environmental information may be used to form a database/repository of enrollment templates with associated environmental information that allows for quicker and more robust fingerprint verification, as described herein.

FIG. 5 depicts the mobile device 200 orientated in a landscape orientation 208 (i.e., 90 degrees offset from the orientation of FIG. 4). The user may be prompted to orient an enrollment finger 206 in the direction of the cued orientation indicator 214. Using the illustrations in FIG. 4 and FIG. 5 as examples, the mobile device 200 may detect the device orientation using, for example, the environmental sensor suite 210. Although the mobile device 200 may include sensors to detect the orientation of the finger 206 and/or the orientation of the mobile device 200, the mobile device 200 may, in some implementations, not include functionality to verify the orientation of the finger 206. As such, the prompted finger orientation information may be used to associate the prompted orientation as indicating the orientation of the fingerprint for indexing or for matching techniques as described herein. In some implementations, the cued orientation of the mobile device and enrollment finger during the enrollment process may be stored with the enrollment template along with the measured orientation and/or other environmental information of the mobile device 200.

After the set of enrollment templates are generated and the enrollment process is complete, a user may desire to be authenticated. In order to be authenticated, the user may present a biometric object, a fingerprint for example (as used herein, the biometric object is referenced as an "inquiry biometric object"), during which an inquiry scanning operation may occur in order to generate an inquiry template corresponding to the inquiry biometric object. While enrollment templates may be generated during an enrollment phase, the inquiry scanning operation may occur during a matching phase for verification/authentication. The inquiry biometric object may or may not be the same biometric object that was presented during enrollment. The inquiry template may be compared to one or more of the enrollment templates through separate comparison operations, which may be carried out concurrently and/or sequentially. Each comparison operation may produce a match score, which may be indicative of a degree to which the inquiry template matches an enrollment template. A comparison may be made between all of the enrollment templates and the inquiry template, or comparisons may be made between a subset (e.g., a number of templates less than a total number of templates) of the enrollment templates and the inquiry template.

Figure 6:
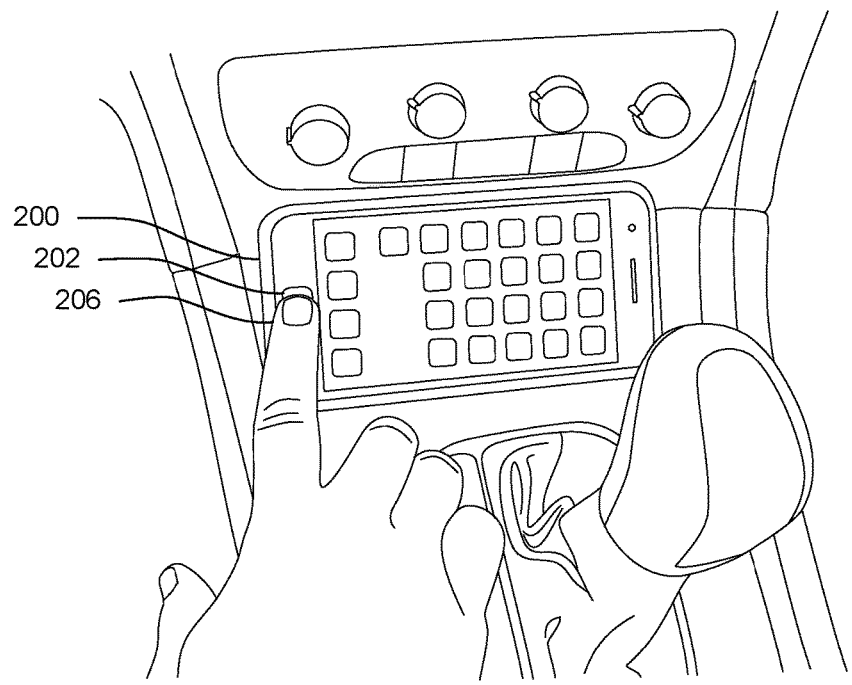
FIGS. 6-8 illustrate an example of a mobile device in a mobile vehicle that is oriented in a particular manner when a user desires to be authenticated.
Figures 7, 8:
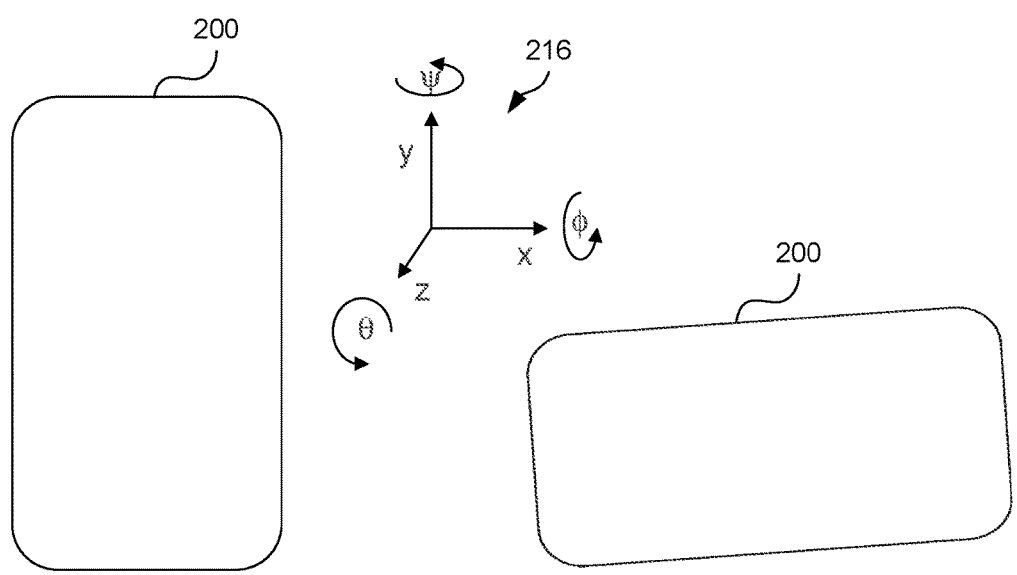

FIGS. 6-8 illustrate an example of a mobile device 200 located in a mobile vehicle that is oriented in a particular manner (for example, mobile device 200 may be mounted to the vehicle or placed in a particular location within the vehicle). Mobile device 200 may be positioned at an orientation that is convenient for the user to access the mobile device while it is in the vehicle, such as on the dash or console of an automobile. When the user desires to use the mobile device, the user may touch biometric sensor 202 associated with the mobile device to be authenticated. In examples such as this, a user may touch the biometric sensor 202 at a substantially consistent angle that is less than optimum, e.g., relatively few minutiae or keypoints may be captured by the biometric sensor 202, making the matching process more challenging.

Being able to measure an orientation of the mobile device when used in a vehicle (illustrated in FIG. 8) with respect to a reference orientation 216 as shown in FIG. 7 provides environmental information with which matching techniques may be adjusted or improved. The orientation 216 may be the orientation of mobile device 200 used for enrollment. Various operating parameters for matching may be adjusted, such as 1) selecting one or more enrollment templates with stored associated environmental information metadata that closely matches the current device orientation; 2) attempting matching using a pre-selected enrollment template that was successfully matched to the enrolled user at one or more previous authentication processes with the mobile device at or near the current orientation; 3) adjusting the starting angle by which keypoint or minutiae matching may proceed; 4) estimating which portion of an enrolled finger (e.g., the fingertip) may have been imaged; and/or 5) momentarily modifying a threshold associated with a successful match. Other environmental information, such as location information, vibrations from the vehicle illustrated in FIG. 6 or recent vehicle turning, accelerations or decelerations as measured by the mobile device, may further aid in adjusting the matching techniques. In the example shown in FIGS. 6 and 8, the coordinate system 216 for the rotated (in-use) orientation is approximately 90 degrees about the z axis, 60 degrees about the x axis, and 0 degrees about the y axis with respect to the non-rotated (reference) orientation associated with the mobile device illustrated in FIG. 7.

FIGS. 9-11 illustrate an example of a mobile device in a user's hand that is oriented in a particular manner when the user desires to be authenticated. In FIG. 9, mobile device 200 is shown positioned in an angled orientation wherein a user may hold the device, such as while walking or sitting in a chair. When the user desires to use the mobile device 200, the user may touch the biometric sensor 202 associated with the mobile device with a finger 206 for authentication via matching. In examples such as these, the user may tend to touch the biometric sensor with the same finger and at a substantially consistent angle for authentication. Being able to measure the current orientation 220 of the mobile device as in FIG. 11 with respect to a reference orientation 216 as shown in FIG. 10 may provide environmental information by which a matching technique may adjust various operating parameters, as described herein. Other environmental information, such as the pace or stride of the user as measured by the mobile device, may further aid the matching techniques. In the example shown in FIGS. 9-11, the coordinate system for the rotated (in-use) current orientation 220 is approximately 0 degrees about the z axis, 0 degrees about the y axis, and 65 degrees about the x axis with respect to the non-rotated (reference) orientation 216.

In another example (not shown), a user may rest his or her mobile device on a flat surface (e.g., with the display facing upwards) on a headboard, nightstand or charging station (such as while sleeping). During nighttime, the mobile device may be placed in a substantially flat orientation with the top of the phone pointing skyward, for example, that may be detected using the accelerometers and magnetometers in the environmental sensor suite of a mobile device. This information (orientation, time of day, ambient light level, camera output, etc.) may be used to reduce latency and/or improve matching performance of matching techniques. Other environmental information, such as the length of time that the device has been lying flat or the level of background vibrations as measured by the mobile device, may further enhance the performance of the matching process.

Enrollment Database Matching

Figure 12:
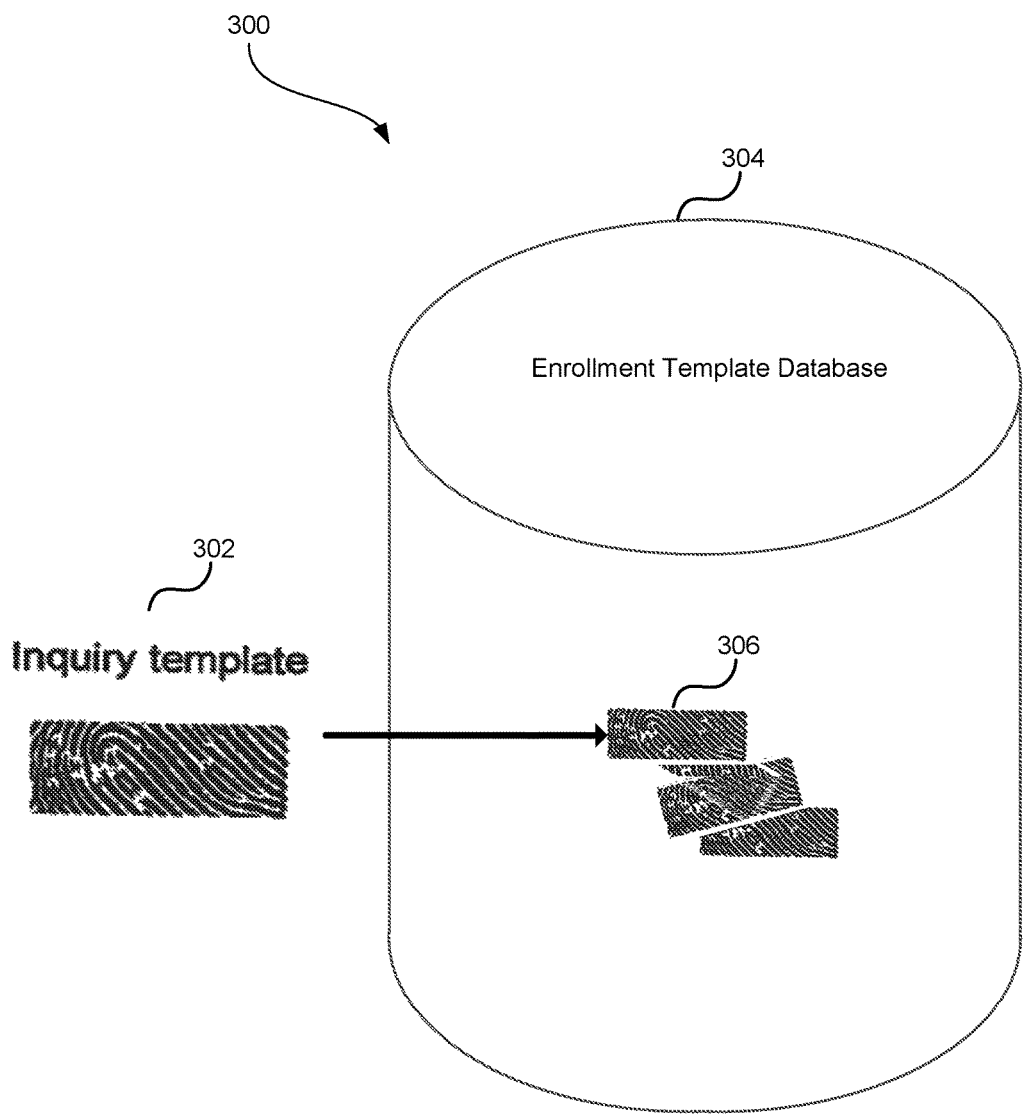
FIG. 12 illustrates an example enrollment template database without associated environmental information.

FIG. 12 illustrates a system 300 wherein an enrollment template database 304 includes variously orientated biometric enrollment templates 306 not associated with environmental information. An inquiry template 302 is illustrated. During the inquiry process, the enrollment template database 304 may be searched in an attempt to locate a corresponding match of the inquiry template 302 to one or more enrollment templates 306. In this illustrated example, the comparison during inquiry may be made between the inquiry template 302 and one or more enrollment templates 306 within the enrollment database 304, either sequentially or in parallel. Although this process may be effective in correctly locating matching templates, it may be time consuming and relatively energy inefficient. As no additional information is used to add context to the inquiry template 302, the device may be required to search all enrollment templates 306 through use of keypoint and/or minutiae matching techniques, for example.

Figure 13:
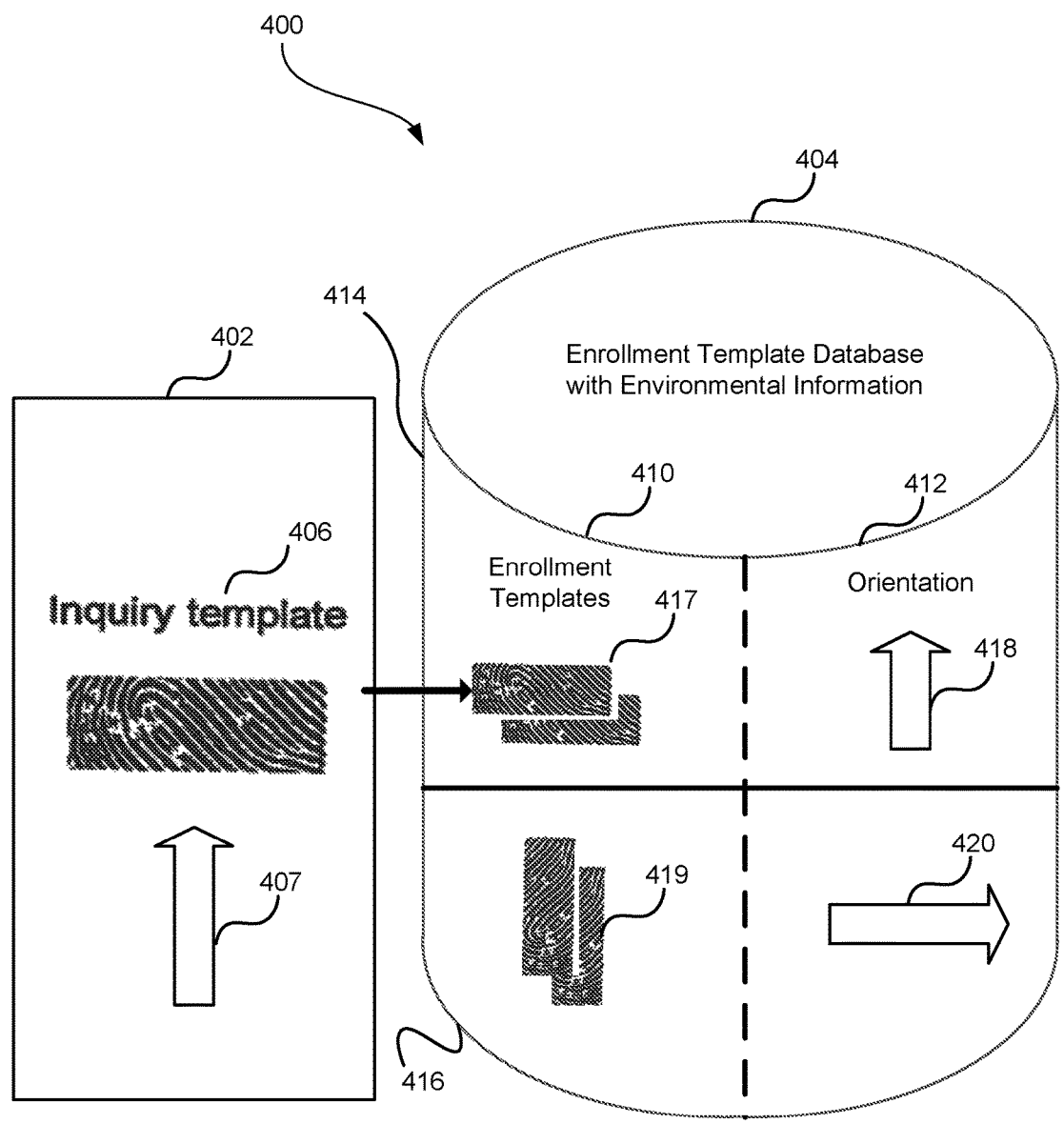
FIG. 13 illustrates an example enrollment template database with associated environmental information.

FIG. 13 illustrates a system 400 that may be implemented in the memory of a mobile device, for example. The system 400 includes an enrollment template database 404 with enrollment templates 410, each having associated environmental information 412. The database 404 illustrated may be formed via the techniques of FIG. 1 and may be locally or remotely located from a mobile device. In some implementations, the database 404 may be shared between several devices, such as to implement a security system for a facility or corporation. FIG. 13 also illustrates an inquiry template 406 associated 402 with environmental information 408. The inquiry template 406 and associated environmental information 408 may be captured using the techniques of FIG. 2, for example. Environmental information 408 may be obtained via use of environmental sensor suite 210, for example. Although environmental information 408 is illustrated as being a direction (for an orientation, for example, environmental information 408 may include temperature, pressure, humidity, vibration, sound, or other information, as disclosed herein. The orientation is an example piece of environmental information that may indicate an orientation of a mobile device (such as a smartphone), such as whether the mobile device is in a landscape or portrait orientation, whether the device is being held or not, or whether the device is lying flat or positioned at an angle with respect to the earth.

The orientation of the device may aid in expediting matching techniques. For example, if the orientation of the device is detected in the notional direction indicated by the illustrated arrow for environmental information 408, techniques may be used to expedite matching of the database by prioritizing or only searching a subset of the enrollment templates as indicated by row 414. In row 414, the notional orientation 418 may be associated with a set of one or more enrollment templates 417. A different orientation 420 may be associated with one or more enrollment templates 419. Another set of enrollment templates (not shown), may be associated with yet another orientation and/or other environmental information. A mobile device 200 in a portrait orientation may be indicated by orientations 418 and 408, for example. A landscape orientation may be indicated by orientation 420. Prioritizing the enrollment templates 417 for matching may expedite the process as it may be that the user orients an enrolled finger approximately the same way when using the mobile device 200 in substantially a portrait orientation, a landscape orientation, a flat or level orientation, or an angled orientation.

The illustrations of FIG. 13 are simplified example visualizations of one use of the techniques disclosed herein. It should be understood that multiple environmental information types or categories may be used and in several permutations. For example, an arrow is illustrated as an orientation having one direction in a two-dimensional plane. Mobile devices may sense orientations in three dimensions and may obtain corresponding three-dimensional orientation data during enrollment and/or inquiry techniques. An inquiry template may be compared to a similarly oriented enrollment template or between severally similarly oriented enrollment templates. In some implementations, one or more orientation angles for the inquiry template may be obtained during the inquiry process and used to prioritize two or more enrollment templates for matching. This may be beneficial in cases when, for example, the orientation of the inquiry template falls between the orientations of two separate enrollment templates. In some implementations, a more extensive set of environmental information data points may be associated with location, temperature, pressure, humidity, vibration, sound, or other data to improve the prioritization/matching techniques. As a further example, a humid or wet environment may cause the user's fingerprints to wrinkle and distort. If the device detects that the environment is more humid, it may prioritize enrollment templates with similarly associated humidity values, or in some implementations, a threshold for matching to an enrolled template may be relaxed. Several permutations of types of environmental data may therefore be associated with enrollment templates and may be used with various weighting factors to prioritize enrollment templates used with the matching process.

The search and prioritization techniques of the matching process may be improved using the disclosed techniques. A weighting may be assigned to one or more environmental information categories in order to form an overall match score or prioritized list of enrollment templates. This weighting may be adaptive to changing environments and locations. Contextual information may be used to adapt the prioritization/search algorithms in order to improve upon the matching algorithm. For example, contextual information may be used to detect if the mobile device were being used on a desk, held in a hand, positioned in an automobile, or placed on a nightstand. A mobile device such as a smartphone or tablet computer may be placed at a certain location and in a similar orientation relatively consistently most evenings for charging, such as when the user is sleeping. When on a nightstand near a user, the user may use the biometric sensor at a relatively consistent orientation between the device and the user in order to access or silence the device. A magnetometer and/or a suite of accelerometers in the mobile device may aid in determining the orientation of the mobile device when the device is lying flat and is relatively motionless. The prioritization/search algorithm may be adapted to prioritize enrollment templates that are associated with similar orientation information.

Inquiry Template Acquisition

Figure 14:
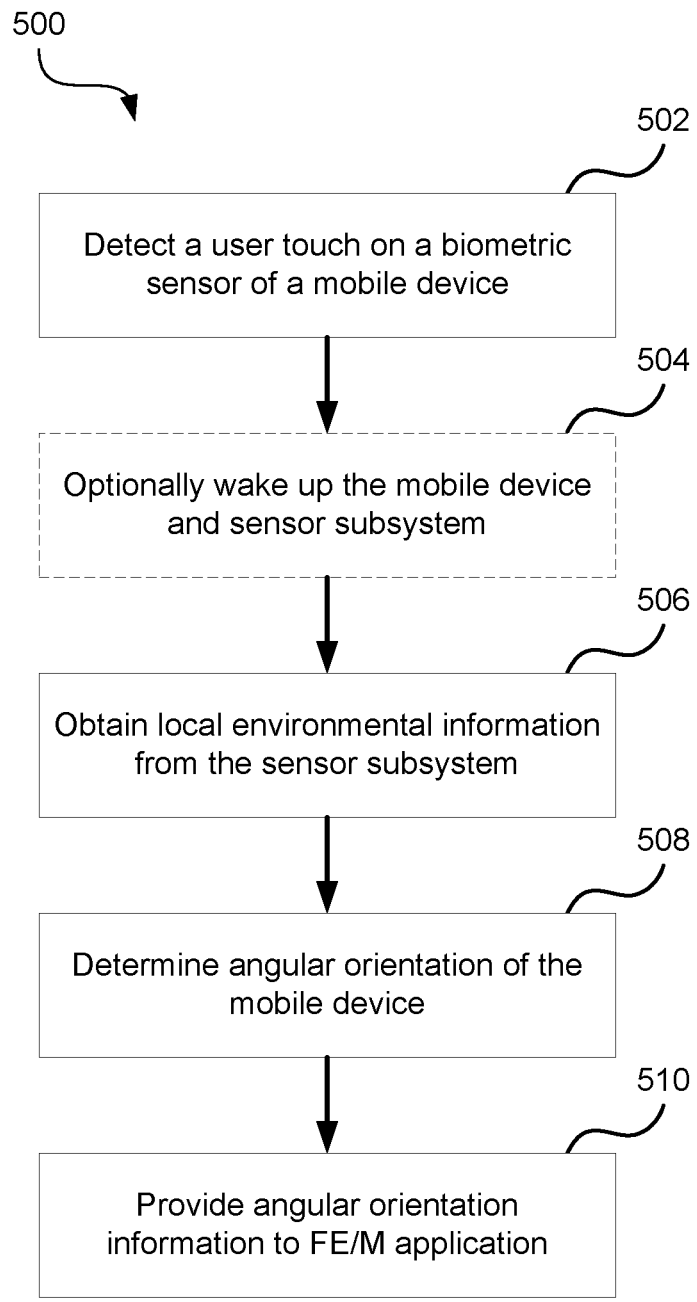
FIG. 14 illustrates an example flowchart for associating environmental information with an inquiry template or an enrollment template.

FIG. 14 illustrates an example flowchart 500 for associating environmental information with an inquiry template or an enrollment template. At step 502, a user's touch on a biometric sensor of a mobile device may be detected, such as a home button with an integrated fingerprint sensor or a dedicated fingerprint sensor of a mobile device. This detection may be via a touchscreen, a capacitive button, an electromechanical switch, a proximity sensor, an imaging sensor, an ultrasonic sensor, or other sensing device. One or more of the sensing devices may be polled periodically to detect a touch from a user. In some implementations, an interrupt to one of the onboard processors or a similar method may be used to indicate the user's touch. At step 504, in some implementations, a mobile device may be powered up or otherwise awoken when the user's touch is detected. Various components of the mobile device, such as an environmental sensor suite and/or an applications processor, may be woken up from a low-power state. At step 506, one or more sensors of the environmental sensor suite may be used to obtain local environmental information, such as from onboard inertial sensors (e.g., accelerometers, gyroscopes and/or magnetometers). At step 508, inertial sensor(s) may be used to detect an orientation of the mobile device and optionally any changes in the orientation of the device. At step 510, the environmental information may be provided to a fingerprint enrollment and matching (FE/M) program or software module for further processing.

Matching Techniques with Device History Information

Figure 15:
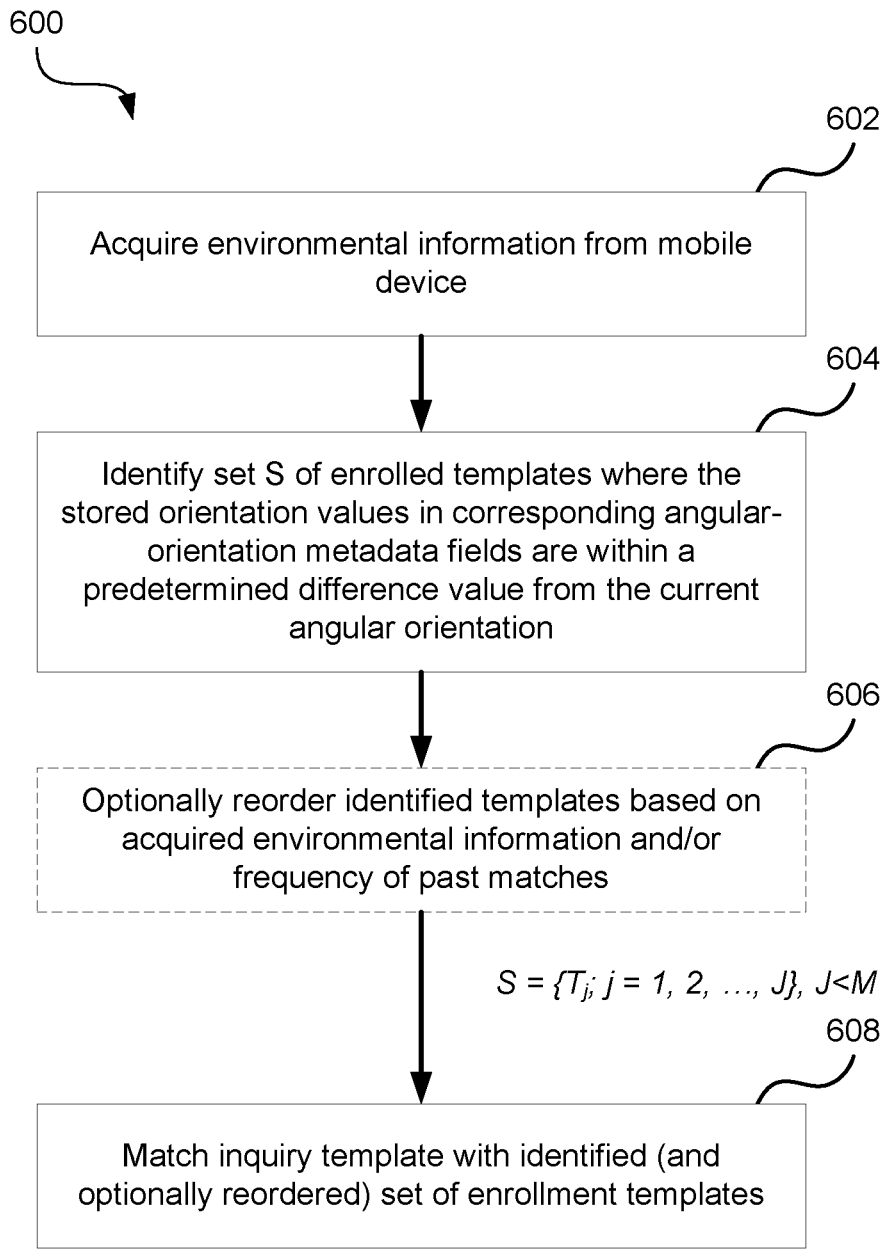
FIG. 15 illustrates an example flowchart for performing matching between an inquiry template and one or more enrollment templates using environmental information.

FIG. 15 illustrates an example flowchart 600 for performing matching between an inquiry template and one or more enrollment templates using environmental information. Flowchart 600 also illustrates an example adaptive algorithm for matching templates. At step 602, environmental information may be acquired, such as orientation information from a device's environmental sensor suite. Step 604 may include performing matching determinations using, for example, techniques of FIG. 2 including use of associated environmental information. For example, a set S of J enrollment templates Tj where j=1, 2, . . . , J and where J is less than the total number M of enrollment templates may be identified where the stored orientation values in corresponding angular-orientation metadata fields are within a predetermined difference value from the current angular orientation. At optional step 606, the priority of enrollment templates may be reordered based upon environmental information and/or frequency of past matches. The frequency of past matches may be obtained as a histogram of past successful matches when the inquiry environmental information is similar to environmental information of past successful matches to enrollment templates. In this manner, the matching algorithm may be further refined to prioritize templates with known successful matches. This example exemplifies the ability to use environmental information or matching statistics including a temporal element to improve the matching process. At step 608, the inquiry template may be matched with the identified and optionally reordered enrollment templates.

Computing Device

Figure 16:
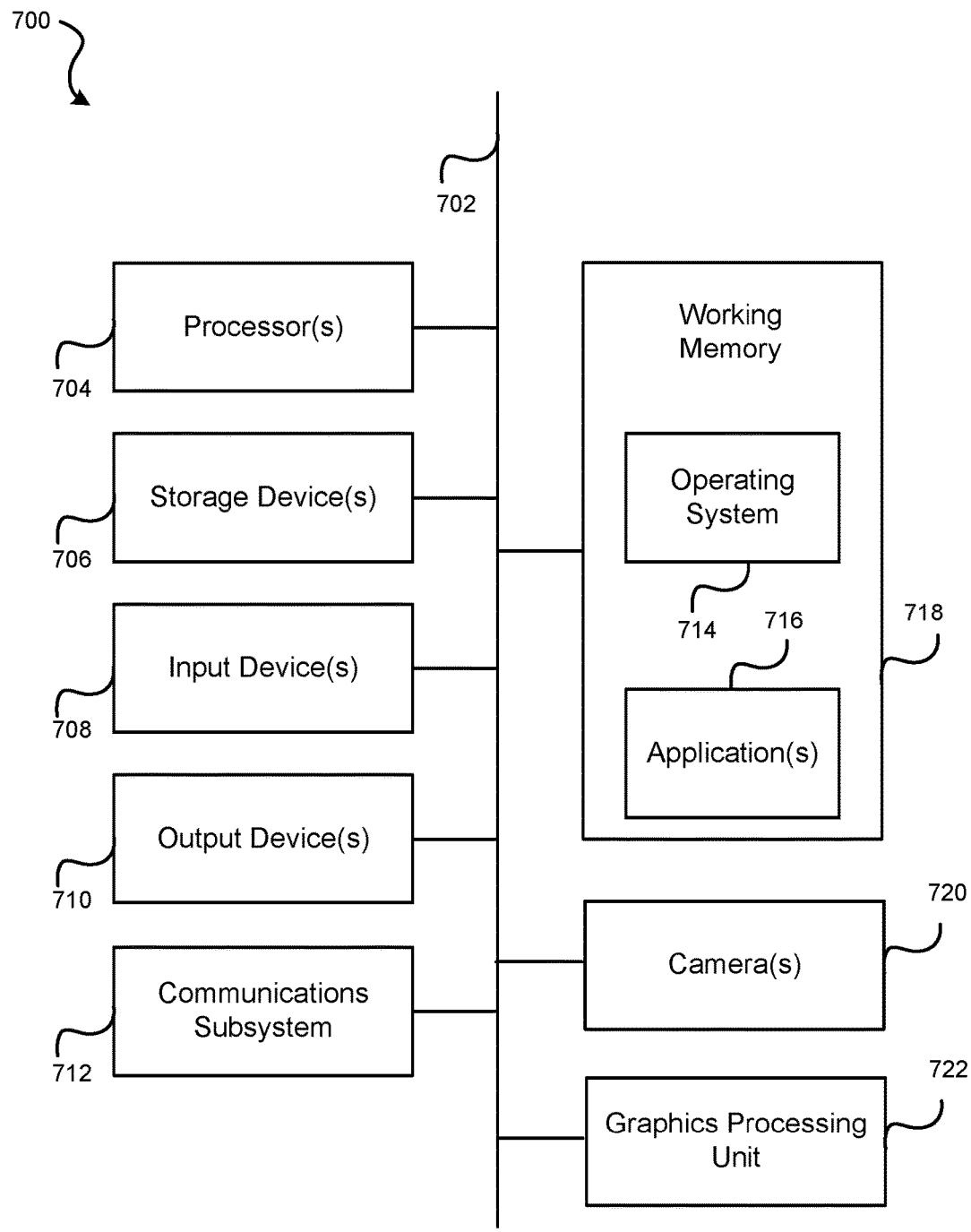
FIG. 16 illustrates an exemplary block diagram of a mobile device that may be configured to implement methods of interactive user fingerprint authentication.

FIG. 16 illustrates an example of a computer system 700 in which one or more implementations may be implemented. Computer system 700 may represent mobile device 200, for example. Computer system 700 may be configured to implement methods of interactive user fingerprint enrollment and authentication according to aspects of the present disclosure. Computer system 700 may represent some of the components of a television, a computing device, a server, a desktop, a workstation, a control or interaction system in an automobile, a tablet computer, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablet computers, smart phones and any other hand-held devices. FIG. 16 provides a schematic illustration of one implementation of a computer system 700 that may perform the methods provided by various other implementations, as described herein, and/or may function as the host computer system, a remote kiosk/terminal, a point-of-sale device, a telephonic or navigation or multimedia interface in an automobile, a computing device, a set-top box, a tablet computer and/or a computer system. FIG. 16 is meant only to provide a generalized illustration of various components, any or all of which may be utilized as appropriate. FIG. 16, therefore, broadly illustrates how individual system elements may be implemented in a relatively separated or relatively more integrated manner.

The computer system 700 is shown comprising hardware elements that may be electrically coupled via a bus 702 (or may otherwise be in communication, as appropriate). The hardware elements may include one or more processors 704, including without limitation one or more general-purpose processors and/or one or more special-purpose processors (such as digital signal processing chips, graphics processing units 722, and/or the like); one or more input devices 708, which may include without limitation one or more cameras, sensors, a mouse, a keyboard, a microphone configured to detect ultrasound or other sounds, and/or the like; and one or more output devices 710, which may include without limitation a display unit such as the device used in implementations of the invention, a printer and/or the like.

In some implementations of the implementations of the invention, various input devices 708 and output devices 710 may be embedded into interfaces such as display devices, tables, floors, walls, and window screens. Furthermore, input devices 708 and output devices 710 coupled to the processors may form multi-dimensional tracking systems.

Computer system 700 may include input devices 710 coupled to bus 702 that may include, for example, inertial sensors and other environmental sensors that may be part of a sensor suite or part of an environmental sensor suite. Inertial sensors of input devices 708 may comprise, for example accelerometers (e.g., collectively responding to acceleration of computer system 700 in one, two or three dimensions), one or more gyroscopes or one or more magnetometers (e.g., to support one or more compass applications). Input devices 708 may include one or more orientation sensors, one or more angular rate sensors or one or more location sensors. Other environmental sensors of computer system 700 may include, for example, temperature sensors, barometric pressure sensors, humidity sensors, ambient light sensors, camera imagers and microphones, among others. Input devices 708 may generate analog or digital signals that may be stored in a working memory 718 or a storage device 706 and processed by DPS(s) or processor 704 in support of one or more applications such as, for example, applications directed to positioning or navigation operations, or to fingerprint enrollment and/or matching processes.

The computer system 700 may further include (and/or be in communication with) one or more non-transitory storage devices 706, which may comprise, without limitation, local and/or network accessible storage, and/or may include, without limitation, a disk drive, a drive array, an optical storage device, a solid-state storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computer system 700 might also include a communications subsystem 712, which may include without limitation a modem, a network card (wireless or wired), an infrared communication device, a wireless communication device and/or chipset (such as a Bluetooth device, an 802.11 device, a WiFi device, a WiMax device, cellular communication facilities, etc.), and/or the like. The communications subsystem 712 may permit data to be exchanged with a network, other computer systems, and/or any other devices described herein. In many implementations, the computer system 700 will further comprise a non-transitory working memory 718, which may include a RAM or ROM device, as described above.

The computer system 700 also may comprise software elements, shown as being currently located within the working memory 718, including an operating system 714, device drivers, executable libraries, and/or other code, such as one or more application programs 716, which may comprise computer programs provided by various implementations, and/or may be designed to implement methods, and/or configure systems, provided by other implementations, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 706 described above. In some cases, the storage medium might be incorporated within a computer system, such as computer system 700. In other implementations, the storage medium might be separate from a computer system (e.g., a removable medium, such as a compact disc), and/or provided in an installation package, such that the storage medium may be used to program, configure and/or adapt a general purpose computer with the instructions/code stored thereon. These instructions might take the form of executable code, which may be executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some implementations, one or more elements of the computer system 700 may be omitted or may be implemented separate from the illustrated system. For example, the processor 704 and/or other elements may be implemented separate from the input device 708. In one implementation, the processor may be configured to receive images from one or more cameras that are separately implemented. In some implementations, elements in addition to those illustrated in FIG. 7 may be included in the computer system 700.

Some implementations may employ a computer system (such as the computer system 700) to perform methods in accordance with the disclosure. For example, some or all of the procedures of the described methods may be performed by the computer system 700 in response to processor 704 executing one or more sequences of one or more instructions (which might be incorporated into the operating system 714 and/or other code, such as an application program 716) contained in the working memory 718. Such instructions may be read into the working memory 718 from another computer-readable medium, such as one or more of the storage device(s) 706. Merely by way of example, execution of the sequences of instructions contained in the working memory 718 might cause the processor(s) 704 to perform one or more procedures of the methods described herein.

The terms "machine-readable medium" and "computer-readable medium," as used herein, refer to any medium that participates in providing data that causes a machine to operate in a specific fashion. In some implementations implemented using the computer system 700, various computer-readable media might be involved in providing instructions/code to processor(s) 704 for execution and/or might be used to store and/or carry such instructions/code (e.g., as signals). In many implementations, a computer-readable medium may be a physical and/or tangible storage medium. Such a medium may take many forms, including but not limited to, non-volatile media, volatile media, and transmission media. Non-volatile media include, for example, optical and/or magnetic disks, such as the storage device(s) 706. Volatile media include, without limitation, dynamic memory, such as the working memory 718. Transmission media include, without limitation, coaxial cables, copper wire and fiber optics, including the wires that comprise the bus 702, as well as the various components of the communications subsystem 712 (and/or the media by which the communications subsystem 712 provides communication with other devices). Hence, transmission media may also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 704 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700. These signals, which might be in the form of electromagnetic signals, acoustic signals, optical signals and/or the like, are all examples of carrier waves on which instructions may be encoded, in accordance with various implementations of the invention.

The communications subsystem 712 (and/or components thereof) generally will receive the signals, and the bus 702 then might carry the signals (and/or the data, instructions, etc. carried by the signals) to the working memory 718, from which the processor(s) 704 retrieves and executes the instructions. The instructions received by the working memory 718 may optionally be stored on a non-transitory storage device 706 either before or after execution by the processor(s) 704.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Moreover, nothing disclosed herein is intended to be dedicated to the public.

While some examples of methods and systems herein are described in terms of software executing on various machines, the methods and systems may also be implemented as specifically-configured hardware, such as field-programmable gate array (FPGA) specifically to execute the various methods. For example, examples may be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, may cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor may read. The processor, and the processing, described may be in one or more structures, and may be dispersed through one or more structures. The processor may comprise code for carrying out one or more of the methods (or parts of methods) described herein.

Adapting Matching Process with Environmental Information

Figure 17:
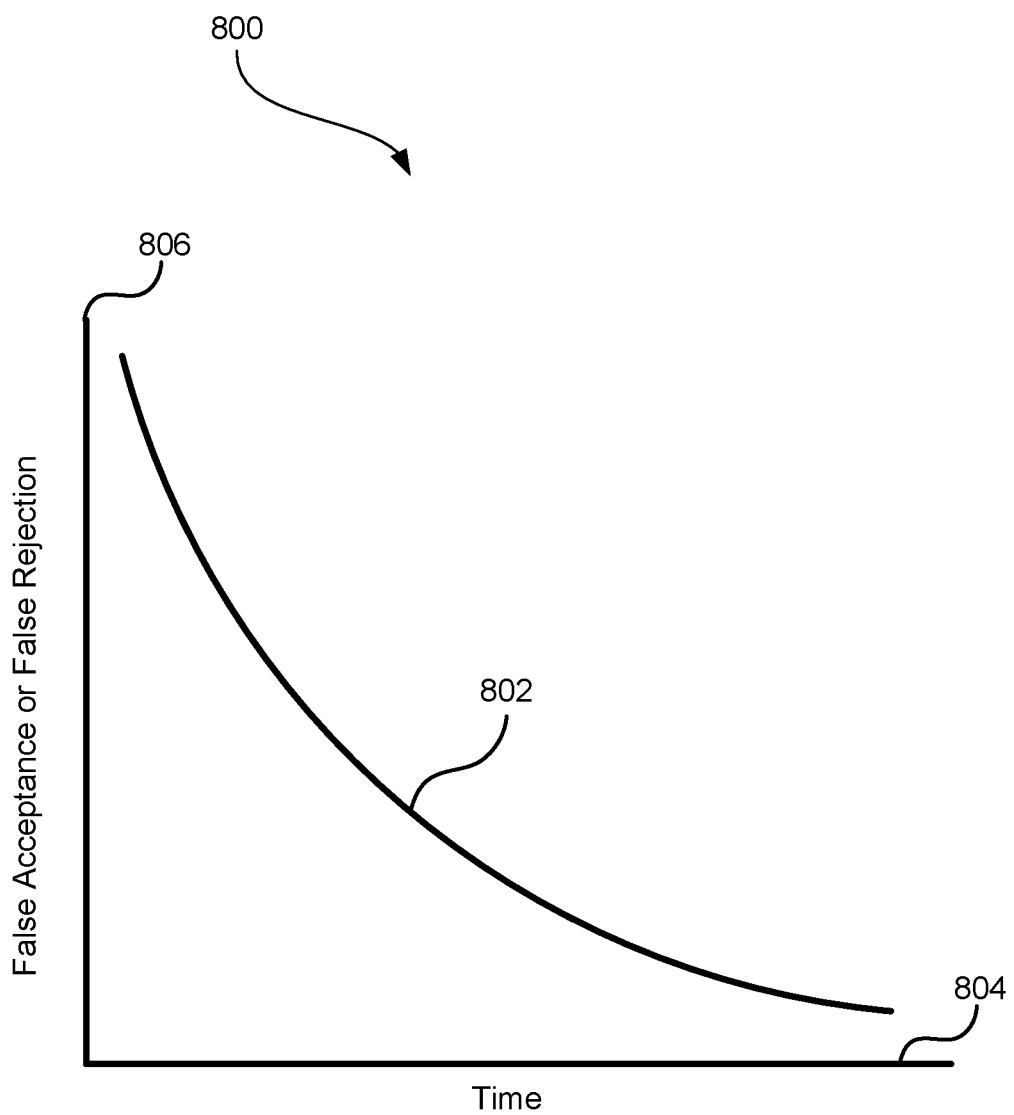
FIG. 17 illustrates an example graph for associating time of matching with false acceptance or false rejection rates.

The matching algorithms used with the process described herein may be adapted depending upon environmental information gathering during enrollment or matching techniques. For example, a mobile device using the techniques described herein may be placed within an automobile, held by a user, or placed upon a table or nightstand. If the device were located inside of an automobile, the device may use an environmental sensor suite to detect that the device is being subjected to certain vibration profiles, is traveling at a certain speed, and/or that a certain audio profile has been detected. Using this information, parameters of a matching technique may be adapted. For example, tolerances of a successful match may be adjusted in order to expedite matching techniques by decreasing a threshold of a valid match while a vehicle is in motion if, for example, sensor data indicates that the device is in a vehicle and at a typical orientation within the vehicle. FIG. 17 illustrates an example graph 800 associating a time (latency) of matching to false acceptance or false rejection rates. The graph contains time on the X-axis 804 and a false acceptance rate or false rejection rate on the y axis 806. The graph 800 illustrates the inverse relationship 802 between the axes. Namely, a more advanced and time-consuming matching algorithm may result in fewer false acceptances and/or false rejections, but may take longer to process. For example, the biometric images, and therefore the inquiry templates that are captured in a moving automobile may be of lower quality and therefore require more processing time to obtain a valid match. By adjusting tolerance parameters of a matching technique, a location on line 802 may be chosen in order to expedite matching techniques, for example, at a cost of potential false acceptances and/or rejections.

Figure 18:
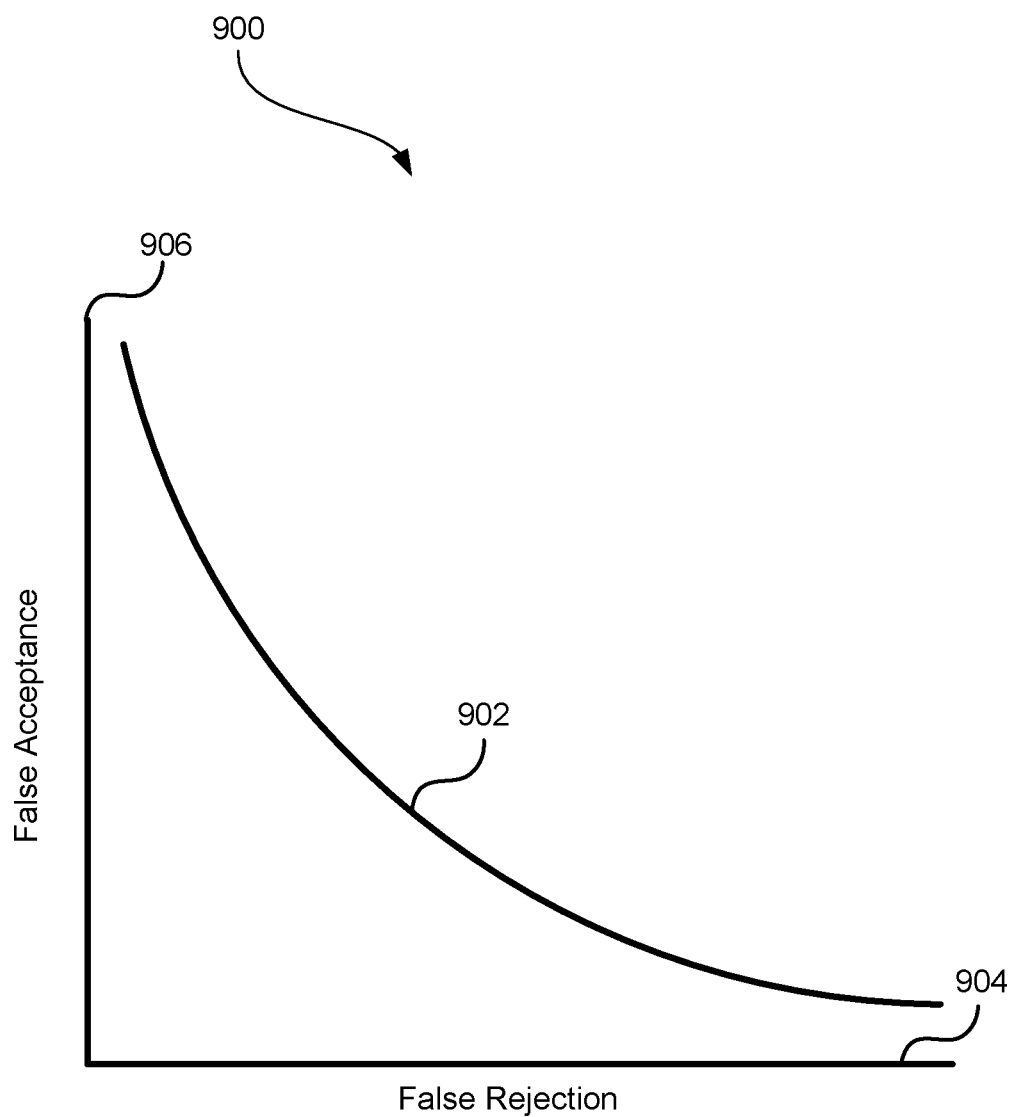
FIG. 18 illustrates an example graph for associating false acceptance rates with false rejection rates during verification/authentication.

FIG. 18 illustrates an example graph for associating false acceptance rates with false rejection rates during authentication. FIG. 18 illustrates an alternate relationship between the false acceptance rate 906 and false rejection rate 904 that may be used to adapt a matching technique. Illustrated is an inverse relationship 902 between these two variables such that allowing an increase in the false rejection rate may result in a decrease in the false acceptance rate. Such a tradeoff may be advantageous in, for example, an automobile environment in order to account for possibly less-than-ideal generation of inquiry templates. The false acceptance rate may be relaxed in order to increase the likelihood that a successful match is obtained between an inquiry template and an enrollment template. Such a tradeoff may be acceptable in the automobile context where it may be less likely that an unauthorized user attempts to gain access to the device using the biometric sensor (i.e., an unauthorized user would likely try to gain access in a more controlled setting).

Figure 19:
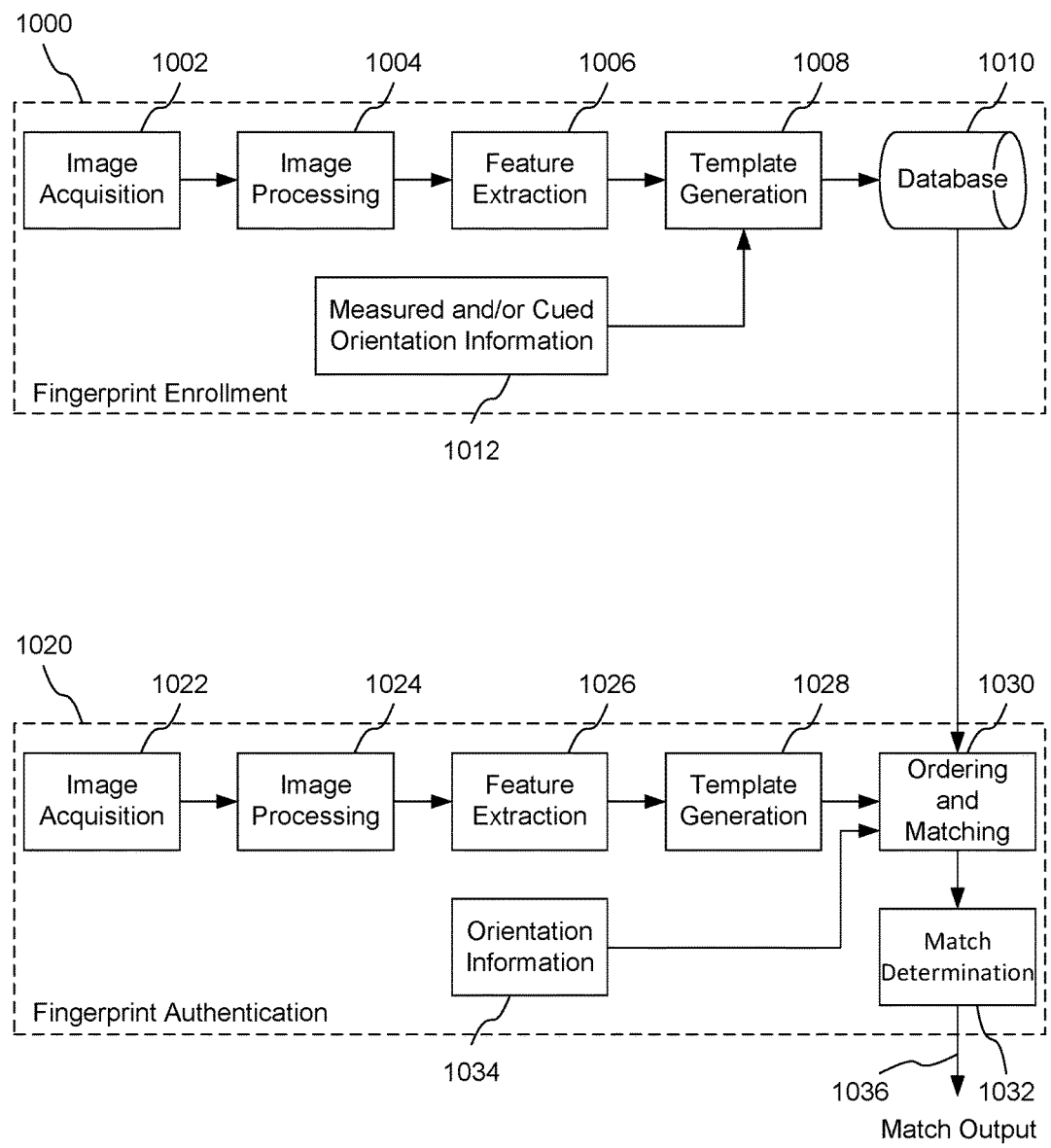
FIG. 19 illustrates generalized flows for fingerprint enrollment and/or authentication of a user, according to aspects of the present disclosure.

FIG. 19 illustrates generalized flows for fingerprint enrollment and/or authentication of a user according to aspects of the present disclosure. In this example, block 1000 describes the enrollment techniques and block 1020 describes verification/authentication techniques. During enrollment 1000, an acquired image may be processed to generate an enrollment template (e.g., template information, template data, biometric reference data, or reference data) that may be stored in a local or external database 1010. Note that a reference may include one or more templates, models, or raw images. In some implementations, the enrollment process may include image acquisition 1002, image processing 1004, feature extraction 1006, template generation 1008, and data storage in a database 1010. The enrollment process may include obtaining environmental information such as angular orientation information of the mobile device and/or cued orientation information 1012 conveyed to a user during enrollment. The verification/authentication process 1020 may include image acquisition 1022, image processing 1024, feature extraction 1026, template generation 1028, fingerprint matching 1030 using information stored in the database 1010, and match determination 1032 to determine and provide a match output signal 1036. In the identification/verification/authentication stage, each acquired image may be processed to generate a template and the generated templates may be used for matching. Environmental information such as angular orientation information 1034 of the mobile device obtained during the verification/authentication process 1020 may aid in match determination. In some implementations, orientation information 1034 may allow for re-ordering a set of enrollment templates to reduce latency and improve performance during fingerprint matching 1030, as disclosed herein. The fingerprint verification/authentication block 1020 may provide a match output signal 1036 indicating whether a match has occurred.

Figure 20:
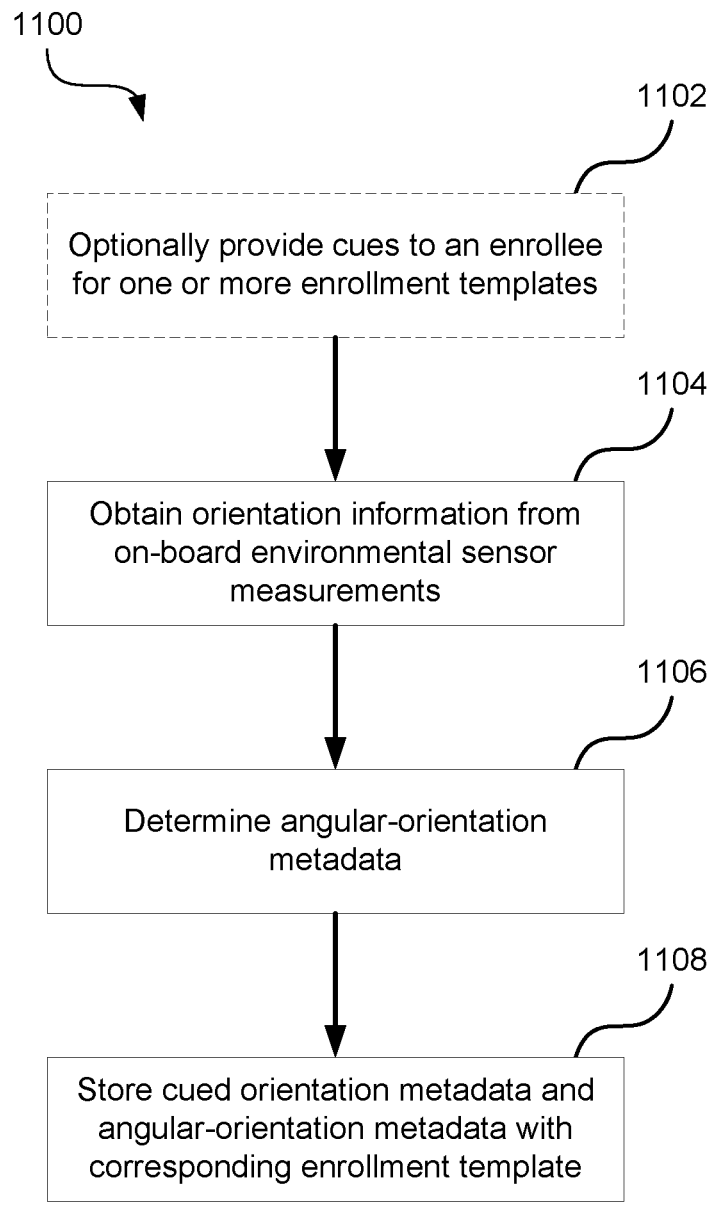
FIG. 20 illustrates a flowchart for metadata creation during an enrollment process and association of the metadata with respective enrollment template(s).

FIG. 20 illustrates a flowchart 1100 for metadata creation during an enrollment process and association of the metadata with respective enrollment template(s). At step 1102, during enrollment of a user's finger on a mobile device, one or more cues may be provided to the user indicating one or more directions in which to hold the mobile device and/or finger (as shown in FIGS. 4 and 5, for example). One or more images of the fingerprint may be acquired to generate the enrollment templates. In some implementations, two or more acquired images may be stitched together to form a composite enrollment template. Visual cues may be provided to the enrollee, for example, with corresponding orientation icons (e.g., 212 and 214) displayed on the display of the mobile device. At step 1104, during enrollment, environmental information such as angular orientation data, accelerometer data, vibration data, magnetometer data, temperature data, pressure data, humidity data, microphone data and camera data may be obtained from one or more sensors associated with the mobile device. At step 1106, angular-orientation metadata and other environmental information metadata may be determined. At step 1108, the angular-orientation metadata and/or the cued orientation metadata may be stored along with the corresponding enrollment template in a database or other template repository. Multiple templates, e.g., pattern and minutiae templates, may be associated with specific angular-orientation metadata for each acquired fingerprint image.

Figure 21:
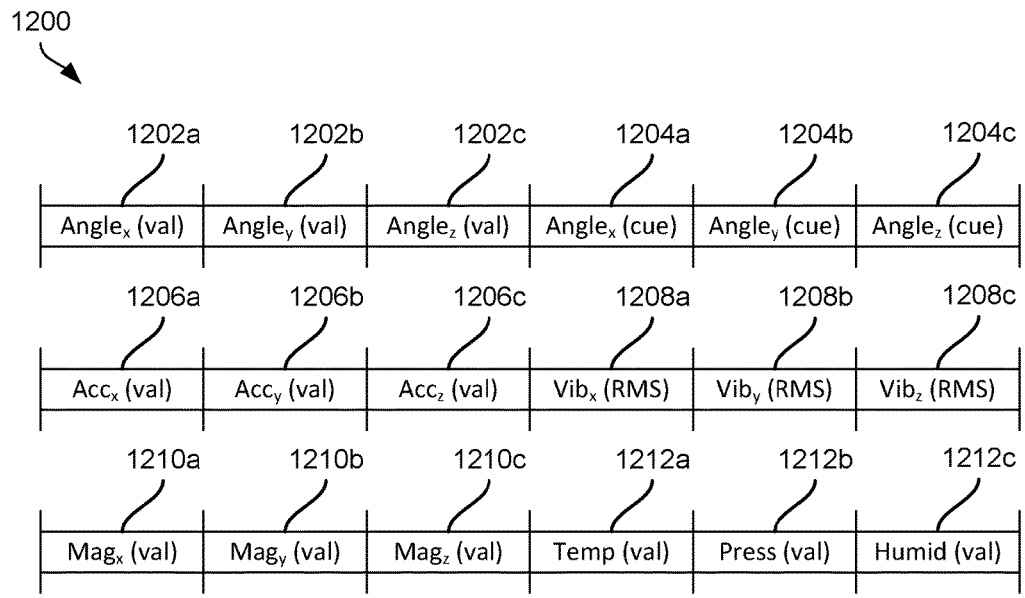
FIG. 21 illustrates an example of environmental information metadata such as cued orientation angles and measured orientation angles, acceleration data, vibration data, directional data and other environmental data taken during an enrollment process.

FIG. 21 illustrates an example of environmental information metadata 1200 such as cued orientation angles and measured orientation angles, acceleration data, vibration data, directional data and other environmental data that may be taken during an enrollment process. Environmental information metadata 1200 may be generated and stored as bytes or words in a string, with various fields in the string indicating various measured and cued variables. For example, measured orientation angles about each of the x, y and z axis may be stored as values for $angle_x$ 1202a, $angle_y$ 1202b and $angle_z$ 1202c. Cued orientation angles for the mobile device may be stored as $angle_x$ 1204a, $angle_y$ 1204b and $angle_z$ 1204c. Other cued angles may be stored as metadata, such as the angle at which a user is prompted to hold his or her finger against a surface of the fingerprint sensor. During enrollment, other environmental information such as local acceleration in the x, y and z directions may be measured and stored as metadata $acceleration_x$ 1206a, $acceleration_y$ 1206b and $acceleration_z$ 1206c. Vibrational information such as the RMS values or frequency components of local acceleration changes with time may be measured and stored as metadata $vibration_x$ 1208a, $vibration_y$ 1208b and $vibration_z$ 1208c. In some implementations, the magnitude of the local magnetic field in the x, y and z directions may be measured and stored as metadata $magnetic\ field_x$ 1210a, $magnetic\ field_y$ 1210b and $magnetic\ field_z$ 1210c. In some implementations, other local environmental information such as temperature, pressure and relative humidity may be measured and stored as metadata temperature 1212a, pressure 1212b or humidity level 1212c. Other metadata such as ambient light level, ambient sound levels, or camera images (not shown) may be measured and stored in a similar manner.

Figure 22:
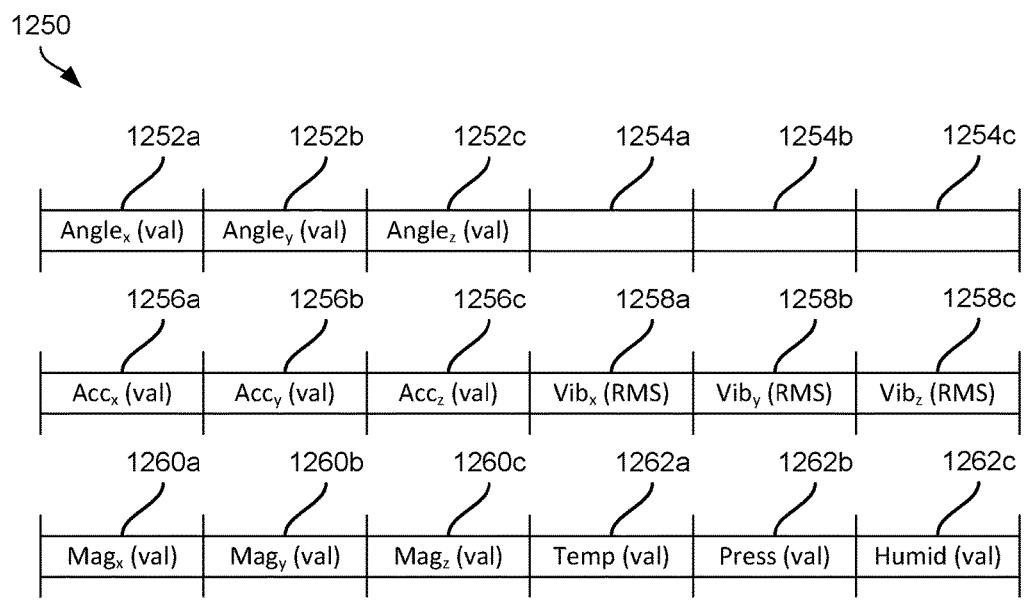
FIG. 22 illustrates an example of environmental information metadata such as measured orientation angles, acceleration data, vibration data, directional data and other environmental data taken during a verification/authentication process.

FIG. 22 illustrates an example of environmental information metadata 1250 such as measured orientation angles, acceleration data, vibration data, directional data and other environmental data acquired during a verification/authentication process. The environmental information metadata 1250 may be associated with an inquiry template and used to match with one or more enrolled templates to reduce latency and improve matching performance. As with the enrollment templates, metadata 1250 may be generated as bytes or words in a string, with various fields in the string indicating various measured variables. For example, orientation angles about each of the x, y and z axis may be stored as values for $angle_x$ 1252a, $angle_y$ 1252b and $angle_z$ 1252c. Cued orientation angles such as $angle_x$ 1254a, $angle_y$ 1254b and $angle_z$ 1254c may be left unfilled during an inquiry process. During verification/authentication, other environmental information such as local acceleration in the x, y and z directions may be measured as metadata $acceleration_x$ 1256a, $acceleration_y$ 1256b and $acceleration_z$ 1256c. Vibrational information such as the RMS values or frequency components of local acceleration changes with time may be measured as metadata $vibration_x$ 1258a, $vibration_y$ 1258b and $vibration_z$ 1258c. In some implementations, the magnitude of the local magnetic field in the x, y and z directions may be measured as metadata $magnetic\ field_x$ 1260a, $magnetic\ field_y$ 1260b and $magnetic\ field_z$ 1260c. In some implementations, other local environmental information such as temperature, pressure and relative humidity may be measured as metadata temperature 1262a, pressure 1262b or humidity level 1262c. In some implementations, other local environmental information such as ambient light level, ambient sound levels, or camera images (not shown) may be measured as metadata and used during a verification/authentication process.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," and "or" as used herein may include a variety of meanings that will depend at least in part upon the context in which it is used. Typically, "or" if used to associate a list, such as a, b or c, is intended to mean a, b, and c, here used in the inclusive sense, as well as a, b or c, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may include all aspects falling within the scope of the appended claims, and equivalents thereof.

What is claimed is:

1. A method, comprising:
   capturing, using a fingerprint sensor of a mobile device, one or more first images of a first fingerprint;
   analyzing the one or more first images to obtain fingerprint information associated with the first fingerprint;
   obtaining, via an orientation sensor of the mobile device, first environmental information indicating a first orientation of the mobile device
   generating, using the fingerprint information and the first environmental information, an enrollment template for the first fingerprint; and
   storing the enrollment template among a plurality of enrollment templates in a memory of the mobile device,
   wherein the fingerprint information of the stored enrollment template is associated with the first environmental information; and
   wherein the stored enrollment template is selected from the plurality of enrollment templates based on second environmental information indicating a second orientation of the mobile device when the mobile device captures one or more second images of a second fingerprint, the selected enrollment template being retrieved to determine a degree of similarity between the first fingerprint and the second fingerprint.

2. The method of claim 1, wherein the first environmental information includes orientation information that indicates the first orientation of the mobile device when the one or more first images are captured.

3. The method of claim 1, wherein storing the enrollment template comprises storing the enrollment template in a database, wherein enrollment templates stored in the database are indexed by environmental information including the first environmental information.

4. The method of claim 1, further comprising:
   capturing, using the fingerprint sensor of the mobile device, the one or more second images of the second fingerprint;
   obtaining, via the orientation sensor of the mobile device, the second environmental information indicating the second orientation of the mobile device; and
   searching, using the second environmental information, for the stored enrollment template.

5. The method of claim 1, wherein at least one of the first environmental information and the second environmental information additionally indicates at least one of:
   a temperature;
   a location;
   a humidity level;

an ambient light level; or a time.

6. The method of claim 1, wherein the mobile device includes, for obtaining at least one of the first environmental information or the second environmental information, at least one of an accelerometer, orientation sensor, angular rate sensor, gyroscope, magnetometer, location sensor, temperature sensor, pressure sensor, ambient light sensor, camera, microphone, or humidity sensor.

7. The method of claim 1, wherein the method further comprises:

prompting, by the mobile device, a user to present a finger at an indicated orientation in relation to the mobile device for capturing at least one of the one or more first images or the one or more second images and at least one of the first environmental information or the second environmental information.

8. The method of claim 7, wherein the fingerprint information is associated with orientation information based on the first orientation of the mobile device and the indicated orientation prompted to the user.

9. The method of claim 1, wherein the method further comprises:

prompting, by the mobile device, a user to orient the mobile device at a preferred orientation for capturing the at least one of the one or more first images or the one or more second images and at least one of the first environmental information or the second environmental information.

10. The method of claim 1, wherein the stored enrollment template to be retrieved based on a degree of similarity between the first orientation and the second orientation.

11. A mobile device, comprising:

a fingerprint sensor;

an orientation sensor;

a memory; and processing logic configured to:

capture, using the fingerprint sensor, one or more first images of a first fingerprint;

analyze the one or more first images to obtain fingerprint information associated with the first fingerprint;

obtain, via the orientation sensor, first environmental information indicating a first orientation of the mobile device associated with the capturing of the one or more first images;

generate, using the fingerprint information and the first environmental information, an enrollment template for the first fingerprint; and store, in the memory, the enrollment template among a plurality of enrollment templates, wherein the fingerprint information of the stored enrollment template is associated with the first environmental information; and wherein the stored enrollment template is selected from the plurality of enrollment templates based on second environmental information indicating a second orientation of the mobile device when the mobile device captures one or more second images of a second fingerprint, the selected enrollment template being retrieved to determine a degree of similarity between the first fingerprint and the second fingerprint.

12. The mobile device of claim 11, wherein the first environmental information includes orientation information that indicates the first orientation of the mobile device when the one or more first images are captured.

13. The mobile device of claim 11, wherein storing the enrollment template comprises storing the enrollment template in a database, wherein enrollment templates stored in the database are indexed by environmental information including the first environmental information.

14. The mobile device of claim 11, wherein the mobile device further includes, for obtaining at least one of the first environmental information or the second environmental information, at least one of an accelerometer, orientation sensor, angular rate sensor, gyroscope, magnetometer, location sensor, temperature sensor, pressure sensor, ambient light sensor, camera, microphone, or humidity sensor.

15. The mobile device of claim 11, wherein the processing logic is further configured to:

display, via a display of the mobile device, a prompt for a user to present a finger at an indicated orientation in relation to the mobile device for capturing at least one of the one or more first images or the one or more second images and at least one of the first environmental information or the second environmental information.

16. The mobile device of claim 15, wherein the processing logic is further configured to:

associate the fingerprint information with orientation information based on the first orientation of the mobile device and the indicated orientation prompted to the user.

17. The mobile device of claim 11, wherein the processing logic is further configured to:

display, via a display of the mobile device, a prompt for a user to orient the mobile device at a preferred orientation for capturing the at least one of the one or more first images or the one or more second images and at least one of the first environmental information or the second environmental information.

18. One or more non-transitory computer-readable media storing computer-executable instructions executable by one or more processors, the computer-executable instructions that, when executed by the one or more processors, configures the one or more processors to:

capture, using a fingerprint sensor of a mobile device, one or more first images of a first fingerprint;

analyze the one or more first images to obtain fingerprint information associated with the first fingerprint;

obtain, via an orientation sensor of the mobile device, first environmental information indicating a first orientation of the mobile device associated with the capturing of the one or more first images;

generate, using the fingerprint information and the first environmental information, an enrollment template for the first fingerprint; and store the enrollment template among a plurality of enrollment templates in a memory of the mobile device, wherein the fingerprint information of the stored enrollment template is associated with the first environmental information, wherein the stored enrollment template is selected from the plurality of enrollment templates based on second environmental information indicating a second orientation of the mobile device when the mobile device captures one or more second images of a second fingerprint, the selected enrollment template being retrieved to determine a degree of similarity between the first fingerprint and the second fingerprint.

19. The one or more non-transitory computer-readable media of claim 18, wherein the first environmental information includes orientation information that indicates the first orientation of the mobile device when the one or more first images are captured.

20. The one or more non-transitory computer-readable media of claim 18, wherein storing the enrollment template includes storing the enrollment template in a database, wherein enrollment templates stored in the database are indexed by environmental information including the first environmental information.

21. A method, comprising:
    capturing, using a fingerprint sensor of a mobile device, one or more images of a fingerprint;
    obtaining, via an orientation sensor of the mobile device, first environmental information indicating a first orientation of the mobile device associated with the capturing of the one or more images;
    retrieving, from a memory of the mobile device and based on the first orientation of the mobile device indicated in the first environmental information, an enrollment template from a plurality of enrollment templates, the enrollment template being associated with second environmental information indicating a second orientation of the mobile device; and
    authenticating a user of the mobile device based on the one or more images and the retrieved enrollment template.

22. The method of claim 21, wherein the first environmental information includes orientation information that indicates the first orientation of the mobile device when the one or more images are captured.

23. The method of claim 21, wherein the authenticating the user of the mobile device comprises:
    determining whether the one or more images correspond to the enrollment template; and
    upon determining that the one or more images corresponds to the enrollment template, authenticating the user of the mobile device to access a function of the mobile device.

24. The method of claim 23, further comprising:
    upon determining that the one or more images does not correspond to an enrollment template of the plurality of templates, denying the user access to the function of the mobile device.

25. The method of claim 23, further comprising:
    selecting the enrollment template from the plurality of enrollment templates based on determining a similarity between the first environmental information and the second environmental information.

26. The method of claim 25, wherein the selecting includes determining that the second environmental information corresponding to the enrollment template has a higher degree of similarity to the first environmental information than other environmental information corresponding to other enrollment templates of the plurality of enrollment templates.

27. The method of claim 26, wherein the first environmental information and the second environmental information additionally contain information indicative of at least one of:
    a temperature;
    a location;
    a humidity level;
    an ambient light level; or
    a time.

28. The method of claim 27, wherein the information indicative of at least one of the temperature, the location, the humidity level, the ambient light level, or the time is captured when the one or more images are captured.

29. The method of claim 25, wherein the determining the similarity is based on a tolerance wherein the tolerance is based at least one of the first environmental information or the second environmental information.

30. The method of claim 29, further comprising:
    characterizing an environment of the mobile device when the one or more images are captured;
    determining whether the characterized environment indicates that the mobile device is located in an environment hostile to accurate fingerprint imaging; and
    upon determining that the characterized environment indicates that the mobile device is located in an environment hostile to accurate fingerprint imaging, relaxing the tolerance.

31. The method of claim 30, wherein the characterized environment indicating that the mobile device is located in an environment hostile to accurate fingerprint imaging indicates that the mobile device is located within an automobile.

32. The method of claim 21, wherein the plurality of enrollment templates comprises is a first enrollment template;
    associated with a third orientation and a second enrollment template associated with a fourth orientation
    wherein the method further comprises: selecting, based on a relationship between the third orientation and the fourth orientation, the first enrollment template over the second enrollment template to authenticate the user.

33. The method of claim 21, wherein the first environmental information further indicate a state of movement of the mobile device; and
    wherein the enrollment template is retrieved based on at least one of the first orientation or the state of movement of the mobile device indicated in the first environmental information.

34. The method of claim 33, wherein the orientation is associated with a first weight and the state of movement is associated with a second weight; and
    wherein the method further comprises:
        determining contextual information of the mobile device associated with the capturing of the one or more images;
        updating at least one of the first weight or the second weight based on the contextual information; and
        selecting, based on the updated at least one of the first weight or the second weight, one of the orientation or the state of movement as a condition of a search for the enrollment template; and
        searching for the enrollment template based on selected condition.

35. The method of claim 34, wherein the first weight is increased based on the context information indicating that mobile device is at a predetermined location when capturing the one or more images of the fingerprint.

* * * * *